United States Patent [19]
Cox

[11] Patent Number: 5,768,284
[45] Date of Patent: Jun. 16, 1998

[54] MONITORING OF PERIODIC PATTERNS

[75] Inventor: Ross Mitchell Cox, Fair Haven, N.J.

[73] Assignee: AT&T Corp, Middletown, N.J.

[21] Appl. No.: 581,651

[22] Filed: Dec. 29, 1995

[51] Int. Cl.$^6$ ................................................ G06F 11/00
[52] U.S. Cl. ........................ 371/5.1; 371/48.1; 379/113;
379/309
[58] Field of Search ........................... 371/5.1, 48, 69.1,
371/67.1; 360/32, 5; 341/122; 379/113,
309; 395/211, 232

[56] References Cited

U.S. PATENT DOCUMENTS

| | | | |
|---|---|---|---|
| 4,558,379 | 12/1985 | Hütter et al. | 360/32 |
| 4,858,120 | 8/1989 | Samuelson | 395/211 |

*Primary Examiner*—Phung M. Chung

[57] ABSTRACT

The invention features an apparatus and method for detecting recording errors in a telephone network that provides services to a plurality of customers, the method comprising: recording information output by the telephone network relating to the provision of a service to the customers, the information having a periodic pattern; identifying disturbances in the periodic pattern that persist for longer than a predetermined time period; and generating an alarm when the identified disturbances exceed a threshold. Th invention also features using a model to generate a forecast of information that will be output by the network in a time period that has not yet occurred utilizing information recorded during a previous time period, the model including a plurality of states representing disturbances in the periodic pattern, each state representing a disturbance having a different persistence. The system obtains information output by the telephone network relating to the provision of the service to the customers during a time period; compares the forecast with the information obtained during the time period to generate a deviation; uses the deviation to update each of the states; and generates an alarm when a selected one of the states exceeds a threshold.

23 Claims, 6 Drawing Sheets

FIG. 5

ON INPUT: $x = \hat{x}_t$ IS THE ONE STEP AHEAD ESTIMATE OF THE STATE VECTOR $x_t$ WITH $r^t(S_k)$-TH COMPONENT EQUAL TO $s_t^k$, THE K-TH STATE VECTOR.

$L = [L_{ij}]$ IS THE LOWER TRIANGULAR SQUARE ROOT OF $P_t$

AT EPOCH t:

FOR $k = 1, \ldots, M$:

$$x^{r^t(S_k)} = \sum_{t=0}^{D_k-1} \alpha_{k,i} x^{r^t(S_{k-i})} + \sum_{t=1}^{k-1} \beta_{k,i} x^{r^t(S_i)} \qquad \text{FORM } {_kA \cdot \hat{x}_t}$$

FOR $j = 1, \ldots, S_M$:

$$L_{r^t(S_k)j} = \sum_{t=0}^{D_k-1} \alpha_{k,i} L_{r^t(S_{k-i})j} + \sum_{t=1}^{k-1} \beta_{k,i} L_{r^t(S_i)j} \qquad \Biggr\} \; 1. \; \text{FORM } {_kA \cdot {_{k-1}L}}$$

IF $\alpha_{k,i} \neq 0$ FOR SOME $i > 0$ THEN

FOR $j = S_k, \ldots, r^t(S_k)+1$:

$d = \sqrt{L_{r^t(S_k)j}^2 + L_{r^t(S_k)(j-1)}^2}$ $c = L_{r^t(S_k)(j-1)}/d$ $s = L_{r^t(S_k)j}/d$ $L_{r^t(S_k)(j-1)} = d$ FOR $i = j-1, \ldots, S_M$:

temp = $L_{ij}$ $L_{ij} = c \cdot L_{ij} - s \cdot L_{i(j-1)}$ $L_{i(j-1)} = s \cdot \text{temp} + c \cdot L_{i(j-1)}$ $\Biggr\} \; 2.$ CONVERT ${_kA \cdot {_{k-1}L}}$ TO LOWER HESSENBERG FORM ${_kL_H}$ FOR $j = r^t(S_k)+2, \ldots, S_k$:

$d = \sqrt{L_{(j-1)(j-1)}^2 + L_{(j-1)j}^2}$ $c = L_{(j-1)(j-1)}/d$ $s = L_{(j-1)j}/d$ FOR $i = j, \ldots, S_M$:

temp = $L_{ij}$ $L_{ij} = c \cdot L_{ij} - s \cdot L_{i(j-1)}$ $L_{i(j-1)} = s \cdot \text{temp} + c \cdot L_{i(j-1)}$ $\Biggr\} \; 3.$ CONVERT ${_kL_H}$ TO LOWER TRIANGULAR FORM ${_kL_T}$ IF $\gamma_k \neq 0$ THEN LET f BE THE KTH COLUMN OF ${_kF}$ FOR $j = r^t(S_k), \ldots, S_M$:

$d = \sqrt{f_j^2 + L_{jj}^2}$ $c = L_{jj}/d$ $s = f_j/d$

FOR $i = j-1, \ldots, S_M$:

temp = $f_j$ $f_j = c \cdot f_j - s \cdot L_{ij}$ $L_{ij} = s \cdot \text{temp} + c \cdot L_{ij}$ $\Biggr\} \; 4.$ CONVERT $[{_kL_T} \; {_kF}]$ TO LOWER TRIANGULAR FORM $[{_kL} \; 0]$ ON OUTPUT: $x = \hat{x}_t$ THE CURRENT ESTIMATE OF THE STATE VECTOR $x_t$ $L = [L_{ij}]$ IS THE LOWER TRIANGULAR SQUARE ROOT OF $H_{t+1}$ 5,768,284

1

MONITORING OF PERIODIC PATTERNS

FIELD OF THE INVENTION

This invention relates to the monitoring of periodic patterns such as call detail recording in a communications network and, more specifically, to a system for detecting recording failures in near real time.

BACKGROUND OF THE INVENTION

Telephone systems must record details of telephone activity in order to appropriately bill customers for the services provided. For example, the recorded information includes the connection time of the call, the called number and the disconnect time. A bill can then be generated that reflects a charge based on the call duration and the called number.

Call detail record monitoring (or "CDRM") is used to ensure that the call detail records are being properly generated. Errors in the generation of such records can result in significant revenue loss to the telephone service provider. These errors can be caused by call provisioning errors, errors in the transmission of billing information between telephone systems, errors in billing number screening databases, and hardware and software errors. The errors are typically discovered in down-stream billing systems long after they have occurred. Earlier detection can lead to correction of the problem and minimization of the revenue loss.

SUMMARY OF THE INVENTION

The disadvantages of the prior art have been overcome by the present invention which provides, in its preferred embodiment, a system and method for detecting recording errors in a telephone network in near real time by monitoring call detail record count totals for abnormal fluctuations and alarming when such fluctuations are observed.

In one aspect, the invention features an apparatus and method for detecting recording errors in a telephone network that provides services to a plurality of customers, the method comprising: recording information output by the telephone network relating to the provision of a service to the customers, the information having a periodic pattern; identifying disturbances in the periodic pattern that persist for longer than a predetermined time period; and generating an alarm when the identified disturbances exceed a threshold.

In another aspect, the invention comprises an apparatus and method for detecting recording errors in a telephone network that provides services to a plurality of customers, the method comprising: recording information output by the telephone network in a first time period relating to the provision of a service to the customers, the information having a periodic pattern; using a model to generate a forecast of information that will be output by the network in a second time period that has not yet occurred utilizing the information recorded during the first time period, the model including a plurality of states representing disturbances in the periodic pattern, each state representing a disturbance having a different persistence; obtaining information output by the telephone network relating to the provision of the service to the customers during the second time period; comparing the forecast with the information obtained during the second time period to generate a deviation; using the deviation to update each of the states; and generating an alarm when a selected one of the states exceeds a threshold.

In preferred embodiments, the selected one of the states is a state having a longer persistence than any of the other states. The recorded information may be a ratio of calls connected in the network to calls disconnected in the network over a predetermined time period. The recorded information may also be the volume of calls made in the network over a predetermined time period.

The step of using a model to generate a forecast preferably comprises utilizing information recorded prior to the first time period in addition to utilizing information recorded in the first time period.

The preferred method may further comprise the steps of: forecasting, utilizing the information recorded during the second time period and information recorded prior to the second time period, the expected content of information that will be output by the network for a third time period that has not yet occurred; recording information output by the telephone network relating to the provision of the service to the customers in the third time period; and comparing the result of the step of forecasting associated with the third time period with the information recorded during the third time period to generate a second deviation.

The method may further comprise the steps of using the second deviation to update each of the states; and generating an alarm when a selected one of the states exceeds a threshold. The method steps may be carried out for a plurality of services provided by the network.

Each of the method steps are preferably iteratively repeated to continually generate deviations corresponding to a comparison of data recently output by the network and a forecast for the recently output data, such that the states are iteratively updated and alarms are generated if a selected updated state exceeds a threshold. The model may be generated using Kalman filtering.

In yet another aspect, the invention features a method for detecting recording errors in a telephone network that provides services to a plurality of customers, the method comprising: recording information output by the telephone network relating to the provision of a service to the customers, the information having a periodic pattern; generating a model based on the recorded information, the model having a first state representing disturbances in the periodic pattern of a first duration and a second state representing disturbances in the periodic pattern of a second duration, the second duration being longer than the first duration; and generating an alarm when a disturbance in the second state exceeds a threshold.

The above method may further comprise the steps of: using the model to generate a forecast of information that will be output by the telephone network for a time period that has not yet occurred; recording information output by the telephone network during the time period; and comparing the result of the forecasting step with the information recorded during the time period to generate a deviation. The deviation may be used to update each of the states.

In still another aspect, the invention features a method for detecting recording errors in a telephone network that provides services to a plurality of customers, the method comprising: recording information output by the telephone network relating to the provision of a service to the customers, the information having a periodic pattern; identifying disturbances in the periodic pattern of a first duration; identifying disturbances in the periodic pattern of a second duration, the second duration being longer than the first duration; generating an alarm when a the disturbance of the second duration exceeds a threshold.

In yet another aspect, the invention features an apparatus and method for detecting recording errors in a telephone network that provides services to a plurality of customers, the method comprising: (a) recording information output by the telephone network relating to the provision of a service to the customers in a first time period; (b) generating a model based on the information recorded in the first time period, the model including a first state representing disturbances in the information of a first persistence and a second state data representing disturbances in the information of a second persistence, the second persistence being longer than the first persistence; (c) using the model to generate a forecast of information to be output by the network for a future time period; (d) recording, during the occurrence of the future time period, information output by the telephone network relating to the provision of the service to the customers; (e) comparing the forecast generated in step (c) with the information recorded in step (d) to generate a deviation; (f) updating each of the states based on the deviation generated in the preceding step; (g) generating an alarm when a selected one of the states exceeds a threshold; and (h) iteratively repeating steps (c)–(g) to continually generate alarms whenever the selected one of the states exceeds the threshold.

In the preferred embodiments, the selected one of the states (step (g)) is the second state.

BRIEF DESCRIPTION OF THE DRAWINGS

FIG. 5 is a pseudo-code listing for the time update portion of the general Kalman filter monitoring algorithm of the preferred embodiment.

DETAILED DESCRITION OF THE PREFERRED EMBODIMENTS

One embodiment of the invention will be described in the environment of detecting and alarming on call detail recording problems within an AT&T 4ESS™ switch by analyzing deviations in the traffic patterns for these switches. (The electronic switching system of the 4ESS™ design is described in greater detail in a series of articles published in the Bell System Technical Journal (BSTJ), September 1977, Vol. 56, No. 7 at pages 1017 et seq., incorporated herein by reference.)

The 4ESS™ generates a variety of data that can be analyzed to detect errors in call detail recording. For example, a signal known as the MLSS (Machine Load and Service Summary) represents the number of calls connected in the 4ESS™. Another quantity, known as the "tracer" record is a measure of the number of calls completed. A "connected" call is one that has been received at the other end. A "completed" call is one that has been disconnected or terminated.

Connected calls should correspond in a one-to-one fashion with disconnected calls, since every call that is connected must eventually be disconnected. Similarly, there can be no disconnection without an earlier connection. Thus, in the absence of recording errors, the MLSS and tracer records will differ only in their timing. The ratio of these two types of records for any given hour can therefore be expected to be close to one since most connected calls are disconnected within the hour they were initiated and since the connected calls completed in an hour after they were initiated will be partially offset in number by new connected calls which complete in a subsequent hour.

Figure 1:
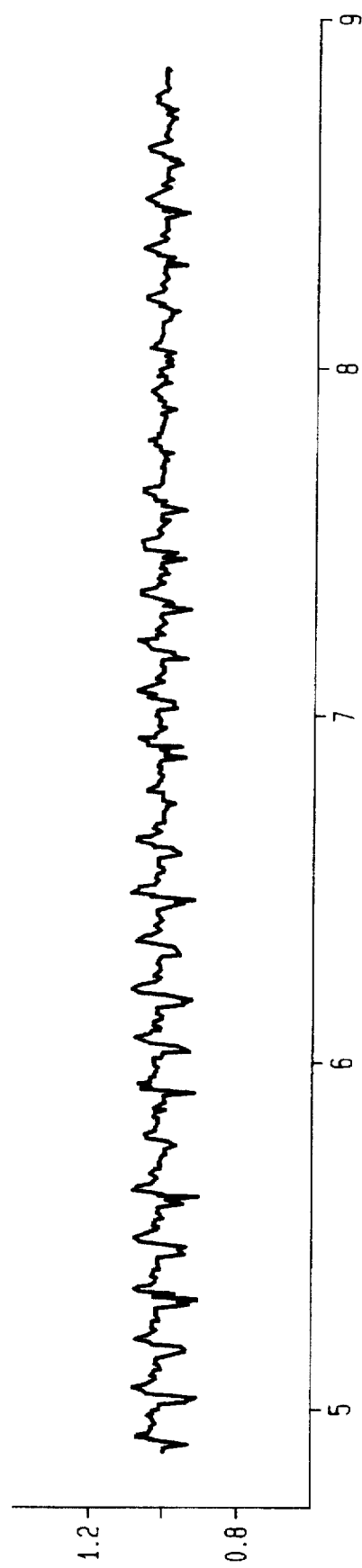
FIG. 1 is an illustration of a ratio time series associated with an AT&T 4ESS™ switch recorded over a four week period.

During normal operation (no lost records) the ratio values follow a pattern with daily and weekly periodicities. This pattern can (and typically does) vary from switch to switch and service to service. FIG. 1 is an example of a ratio timeseries over a period of four weeks. The regularity of the pattern is apparent.

The value of the ratio in FIG. 1 exceeds one when the number of calls that are being connected exceeds the number of calls being disconnected, as in the case, for example, during the starting business hours of each day. The ratio drops below 1 in the converse situation, when the number of disconnected calls outweighs the number of calls being connected, as happens, for example, during the late afternoon hours for those business oriented services.

A first embodiment of the present invention is used to monitor a ratios timeseries, such as the one illustrated in FIG. 1, to detect potential failures in the recording of data which will cause abnormal fluctuations in the ratio time series. The preferred embodiment accomplishes the monitoring by creating a forecast of the timeseries based on current knowledge of the timeseries (i.e., its present value) and on knowledge of the history of the timeseries. This forecast is then subtracted from the actual data value to form an error term which is mathematically analyzed, via the framework of Kalman filtering theory, for the presence of abnormal disturbances.

Figure 2:
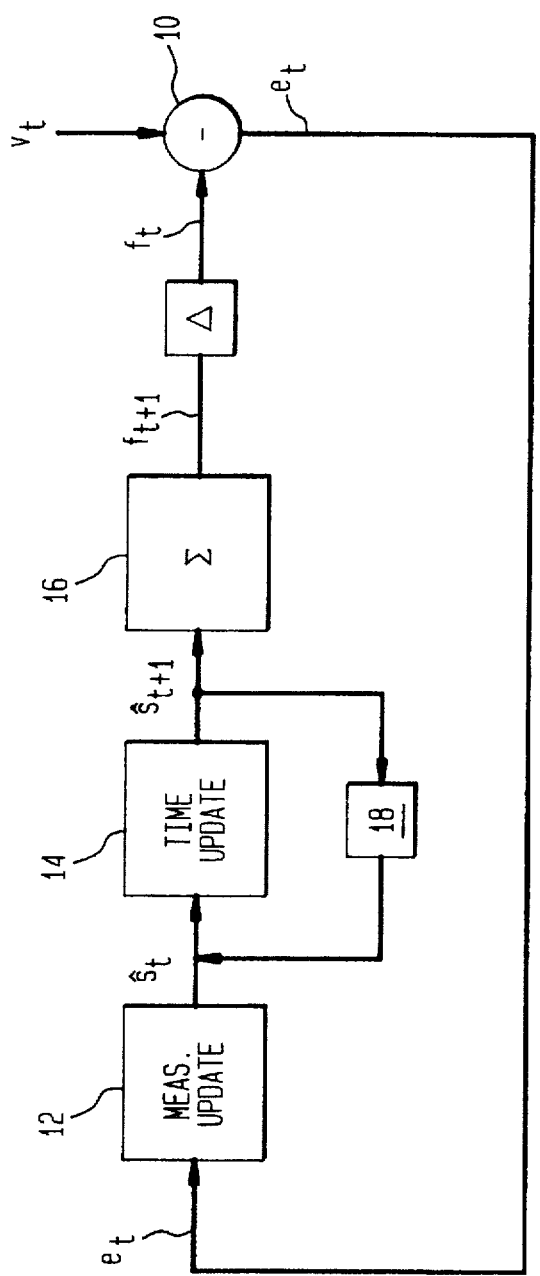
FIG. 2 is a block diagram of a system used to monitor a ratio timeseries in accordance with one embodiment of the invention.

FIG. 2 illustrates a first embodiment used to accomplish the ratios monitoring and includes a subtractor 10 which receives as its input a current value of a monitored ratio timeseries $v_t$ (i.e., the value of the ratios timeseries at current time t) and a previously calculated forecast $f_t$ of the timeseries. The difference between the timeseries $v_t$ and the forecast $f_t$ is output as an error signal $e_t$.

Error signal $e_t$ is input into a measurement update module 12 that functions to update a vector quantity $\hat{s}_t$ which is an estimate of the current value of a number of states of a "state space model" of the ratio timeseries. The updated vector quantity $\hat{s}_t$ is generated using Kalman filtering theory. The Kalman filter is an estimation technique discovered in 1960 by R. E. Kalman., and is well known to those skilled in mathematical modelling of mechanical systems. For example, the Kalman filter has been widely used in the area of tracking and navigation (e.g., in connection with satellites).

Figure 3:
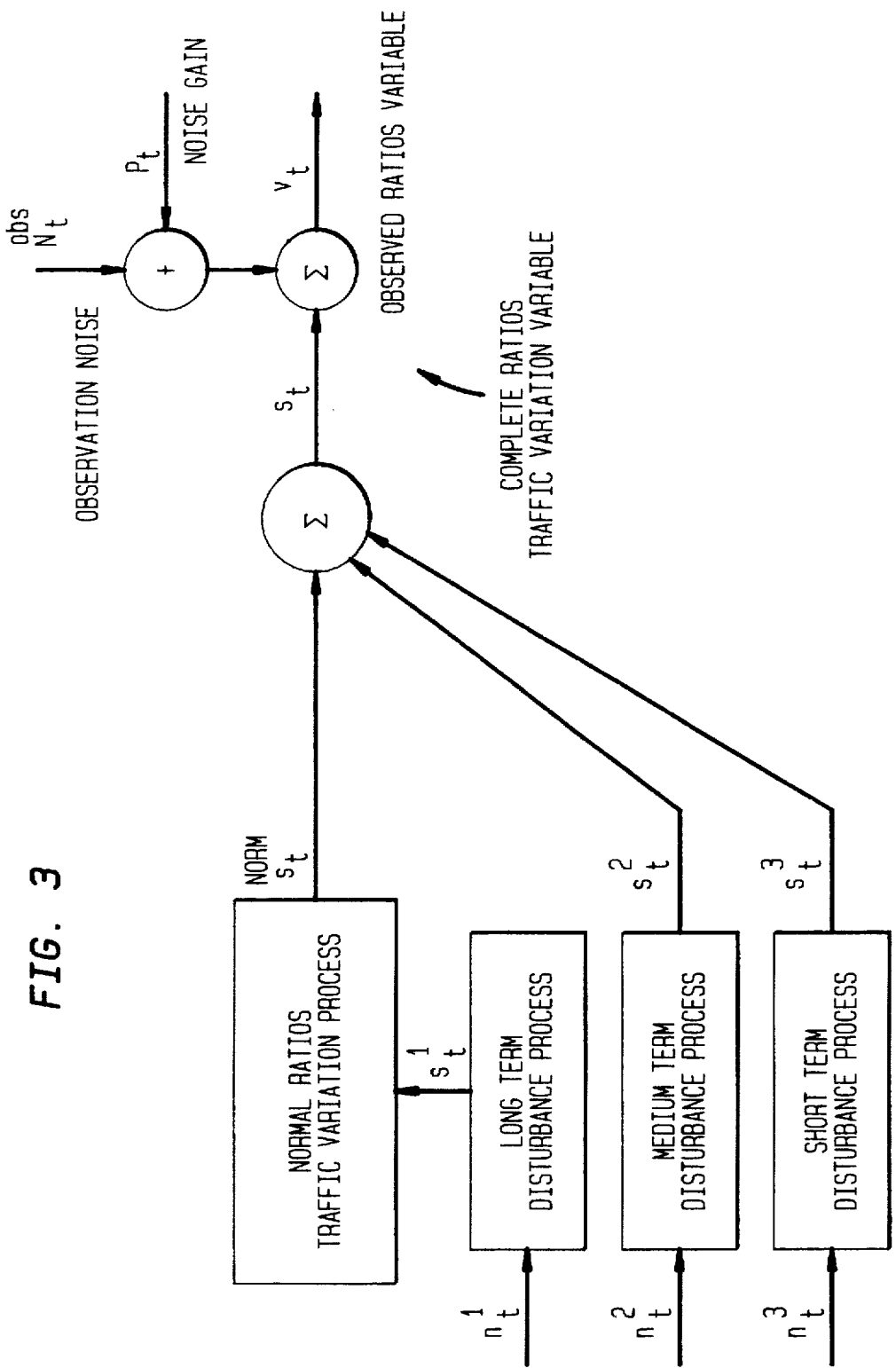
FIG. 3 is a block diagram of a mathematical model used to generate various states in accordance with the embodiment of FIG. 2.

The state space model used by the present invention is illustrated in FIG. 3. It should be understood that FIG. 3 is not a real (i.e., physical) system and the blocks in FIG. 3 do not correspond to a physical structure but to a model of a system that is assumed to generate the values $v_t$. The only "real" element in FIG. 3 is output signal $v_t$, which represents the observed value of the ratio timeseries. The other "signals" and blocks illustrated in FIG. 3 comprise the model that is needed by the Kalman filter formalism to generate its estimates. Kalman filter theory is a parametric theory of estimation, meaning that it needs a parametric description (model) of the signal generation process before it can produce its estimates. The model we use for ratios monitoring is that presented in FIG. 3. This model assumes that the ratios value $v_t$ is a sum of three others: a normal term ($s_t^{norm}$ in FIG. 3) representing the normal weekly fluctuation of the ratios measurement, and two disturbance processes $s_t^2$ and $s_t^3$. The normal variable $s_t^{norm}$ is driven by another disturbance variable $s_t^1$ which in turn is driven by the noise variable $n_t^1$. The disturbance variables $s_t^1$ and $s_t^3$ are driven by the noise variables $n_t^2$ and $n_t^3$, respectively.

The inputs $n_t^1$, $n_t^2$, and $n_t^3$ are stochastically independent of each other and therefore so are the disturbance variables $s_t^1$, $s_t^2$, and $s_t^3$. Notice that the long term disturbance variable $s_t^1$ drives the normal ratio traffic variable $s_t^{norm}$. In words this says that the long term disturbance variable $s_t^1$ can permanently affect the pattern of the normal variable $s_t^{norm}$. Without this link between at least one of the disturbance processes and the normal process our model would say that the normal process has a fixed pattern which does not vary with time. Allowing the long term disturbance process to affect the normal process allows the normal process to adjust to permanent changes in the timeseries.

The variables $s_t^{norm}$, $s_t^1$, $s_t^2$, and $s_t^3$ are states within our state space model. There will be other states as well, as described below, but they are auxiliary states which must be retained solely for the purpose of updating the states $s_t^{norm}$, $s_t^1$, $s_t^2$, and $s_t^3$. The state estimate $\hat{s}_t^1$ of $s_t^2$, the long term disturbance variable, is the quantity used to construct alarms, discussed further below. The state estimates of the medium and short term variables are not used for forming alarms in this embodiment, although they are needed for updating the other state estimates, including $\hat{s}_t^1$. The complete ratio traffic variation variable, denoted by $s_t$ in FIG. 3, is a sum of the three processes, $s_t^{norm}$, $s_t^2$, and $s_t^3$.

As noted above, the variable $v_t$ is the observed ratio traffic variable, or the data which is actually recorded by CDRM. The variable $N_t^{obs}$ is a noise variable which is uncorrelated with the other noise inputs $n_t^1$, $n_t^2$, and $n_t^3$, and which, upon multiplication by the gain $p_t$ is added to the complete ratio traffic variation variable $s_t$ to form the observed variable $v_t$. $N_t^{obs}$ may be thought of as an observation noise which is corrupting our observation of $s_t$.

Returning to FIG. 2, the state estimate $\hat{s}_t$ is used to generate a forecast of each of the states of the timeseries in forecast module 14 for a future time period t+1. This is accomplished by extrapolating future values of each state based on the present values and histories of it and the other states. The output of module 14 is the quantity $\bar{s}_{t+1}$ representing the forecast for each of the states at time t+1.

A summation module 16 sums the forecasts for the various states in $\bar{s}_{t+1}$ to generate a single forecast value $f_{t+1}$ for the timeseries at time t+1. A delay module then causes the system to wait until time t+1 becomes the present time and sets the previously generated forecast $f_{t+1}$ equal to $f_t$, the forecast for current time t. As noted above, subtractor 10 then determines the difference between forecast $f_t$ and the current value $v_t$ of the timeseries.

If a current value of the timeseries is not available (i.e., missing) then a missing data detector 18 feeds $\bar{s}_{t+1}$ back into the input of time update module 14 to generate a forecast for the next time period. In other words, since no comparison step can be performed if data $v_t$ is not available, the system uses the current forecast to create a forecast for the next time period (i.e., it extends the extrapolation to the next time period).

As noted above, Kalman filtering techniques are used to generate the estimates as shown in, FIG. 1 and to create the alarms that are used to indicate when a recording error is believed to have occurred. We next explain how Kalman filtering is used in the present invention to achieve these results.

The Kalman filter method of estimation is a recursive method of estimation, meaning that at each hour it computes an updated estimate of the ratio traffic variable as a function of a finite number of retained quantities which are updated at the same time as the ratio estimate. As noted above, in Kalman filter theory, a "model" is used to generate the forecast and the model used in the preferred embodiment is illustrated in FIG. 3.

The quantities updated within the Kalman filter model are called "states", the estimates of them (the retained quantities updated by the Kalman filter) are called "state estimates", and the Kalman filter model is called a "state space model". For any given choice of statistical model for the observed variable, there will be many possible choices for the states, i.e., there will be many choices for the state-space model. All of these will be equally good in modeling the observed data; however, since it is an object of the invention not to estimate or forecast the observed data itself but to estimate or detect some feature or deviation within the data, a state space model which contains this feature as a state will be preferable from the point of view of Kalman filtering theory. This is because the Kalman filter based on this state space model will retain and update an estimate of this feature along with its estimate of the observed variable.

The state space models used by the Kalman filter method are capable of modeling variables resulting from multiple processes. The model used for the ratio data is a superposition of three different processes occurring at once—one is the normal traffic variation process and the other two are disturbance processes. This superposition process is called the complete ratio traffic process and the resulting variable the complete ratio traffic variable. In addition, there is a disturbance process which drives the normal traffic variation process, discussed further below.

The three disturbance processes model disturbances having different levels of persistence. Each of these disturbances is modeled by a state. By thresholding on the state estimates which are produced by the Kalman filter and which correspond to these states, three different types of alarms are constructed, one for each of the three different types of disturbances. In the preferred embodiment, only one type of disturbance is used for alarming and the other two alarms are simply ignored. (Although all three could be used.)

There are basically two different reasons for large differences between the actual timeseries and the forecast timeseries: (1) there may be a disturbance in the timeseries data that could indicate a call detail recording error; or (2) there could be a large random fluctuation in the data. The invention seeks to alarm only on the first of these cases.

The state space model describes the complete ratio traffic variable as a sum of three states which are denoted by $s_t^{norm}$, $s_t^2$, and $s_t^3$. These states represent the normal ratio traffic variation process and the medium and short term disturbance variables, respectively. In addition there is a state for a third disturbance variable $s_t^1$ 191 additional auxiliary states which are needed to write 195 equations describing the individual updating of each of these states. It is convenient to consider the states to be the components of a single 195 dimensional vector $x_t$. More generally, the updating of the states in any state space model are most easily expressed in matrix notation. For this reason matrix algebra is the natural mathematical language with which to describe state space models and the Kalman filter. Accordingly, our description below of the model used for the complete ratio traffic variation processes will employ matrix notation.

As discussed above, in order to give a complete description of the state space model for the ratio alarming algorithm matrix notation is needed. However, matrix notation is not necessary to describe only the input-output relationships of the model, i.e. the relation between certain noise inputs $n_t^1$, $n_t^2$, and $n_t^3$ and the output (observed) variable it. Giving the input-output relationship is equivalent to giving the statistical description of the ratio traffic variable $v_t$, and can be given entirely in terms of the more familiar ARIMA models used in the so-called Box-Jenkins forecasting theory. (See U.S. patent application Ser. No. 08/346,808 filed Nov. 30, 1994 and assigned to the assignee of this application (incorporated herein by reference)). Since ARIMA models and the Box-Jenkins approach to forecasting are more widely known than the state space models used by Kalman filter theory, we will first give an ARIMA description of the input-output relations of our ratios model. A matrix description of the state space model then follows.

The long term disturbance variable $s_t^1$, the medium term disturbance variable $s_t^2$, and the short term disturbance variable $s_t^3$, are the outputs of three ARIMA models with the inputs $n_t^1$, $n_t^2$, and $n_t^3$. These models are given explicitly by $$s_{t+1}^1 = \beta_w \beta_d (1 - \alpha_w B^{24})^{-1} (1 - \alpha_d B)^{-1} n_t^1 \qquad (1)$$

$$s_{t+1}^2 = \beta_d (1 - \alpha_d B)^{-1} n_t^2$$

$$s_{t+1}^3 = \beta_q (1 - \alpha_q B)^{-1} n_t^3$$

$\alpha_w$, $\alpha_d$, $\alpha_q$, and $\beta_w$, $\beta_d$, $\beta_q$ are constants whose values are given below. The time indexing subscript t+1 on $s_{t+1}^1$, $s_{t+1}^2$, and $s_{t+1}^3$ in (1) is advanced one-hour from the subscripts on the noise processes $n_t^1$, $n_t^2$, $n_t^3$, to agree with the subscripting on these variables in the state space description of this same model below. Also, B in (1) is the backward time shift operator. The normal ratio traffic variable $s_t^{norm}$ is in turn related to the long term disturbance variable $s_t^1$ by the following difference equation:

$$s_{t+1}^{norm} = (1 - B^{168})^{-1} s_{t+1}^1. \qquad (2)$$

This just states that $s_{t+1}^1$ is equal to the difference between the current value of the normal traffic variable $s_{t+1}^{norm}$ and the value it had one week ago, $s_{t-167}^{norm}$. The equation (2) does not qualify for an ARIMA description of the normal process $s_{t+1}^{norm}$ because the input $s_{t+1}^1$ is time-correlated and not white. However, by combining (2) with (1) $s_t^{norm}$ is expressed in terms of $n_t^1$:

$$s_t^{norm} = \beta_w \beta_d (1 - B^{168})^{-1} (1 - \alpha_w B^{24})^{-1} (1 - \alpha_d B)^{-1} n_t^1. \qquad (3)$$

This is an ARIMA description of $s_t^{norm}$ since $n_t^1$ is a white process. The equations in (1) and (3) state that the variables $s_{t+1}^{norm}$, $s_{t+1}^2$, $s_{t+1}^3$ are the outputs of three Box-Jenkins type ARIMA models. To these equations we will add two more to complete the input-output description of the ratio traffic model:

$$s_t = s_t^{norm} + s_t^2 + s_t^3 \qquad (4)$$

$$v_t = s_t + N_t^0. \qquad (5)$$

Here $<N_t^0>$ is a white noise process, independent of $<n_t^1>$, $<n_t^2>$, and $<n_t^3>$, with (possibly time-varying) variance $\sigma_t^{o2}$. The equations (1), (4), and (5) summarize the input-output relationships of the state space model used to describe the ratio traffic variation process $v_t$. This model differs from the general Box-Jenkins type ARIMA model in two respects 1. The observed ratio traffic variable $v_t$ (the input to the estimation algorithm) is modeled as the sum of a "signal" $s_t$ and an independent noise process $N_t^0$. $<s_t>$ can be thought of as the "true" traffic variation process which we are trying to estimate using our noisy observations $<v_t>$. $N_t^0$ is called the observation noise.

2. The signal $s_t$ is modeled as the sum of the outputs $s_t^{norm}$, $s_t^2$, $s_t^3$ of three Box-Jenkins models, each driven by a different noise input $<n_t^1>$, $<n_t^2>$, $<n_t^3>$.

This completes the description of the model for the complete ratio traffic process in terms of ARIMA models. The state space model for this process is discussed next. In the following discussion, $x_t$ will denote the state vector of the state space model (i.e., the 195 dimensional vector whose components are states of the model). Four of the components of $x_t$ are the four states $s_t^{norm}$, $s_t^1$, $s_t^2$, and $s_t^3$ discussed above. The remaining 191 are auxiliary states maintained strictly for the purpose of updating these four states. Most of these auxiliary states are just delayed versions of $s_t^{norm}$ and $s_t^1$. The definitions of these states are given implicitly by the state space model itself.

The state space model for the process described by equations (1), (2) and (4) is given by $$s_t = C x_t$$

$$x_{t+1} = A x_t + F N_t^3 \qquad (6)$$

where the matrices C, A, F are sparse with dimensions and non-zero elements noted in Table 1 below:

TABLE 1

| C: 1 × 195 matrix (row vector) | $C^{1,93} = 1$ |
| --- | --- |
| | $C^{1,94} = 1$ |
| | $C^{1,95} = 1$ |
| A: 195 × 195 square matrix | $A^{1,1} = \alpha_d$ |
| | $A^{25,1} = \alpha_d \cdot \beta_w$ |
| | $A^{25,2} = \alpha_w$ |
| | $A^{193,1} = \alpha_d \cdot \beta_w$ |
| | $A^{193,2} = \alpha_w$ |
| | $A^{193,26} = 1$ |
| | $A^{194,194} = \alpha_d$ |
| | $A^{195,195} = \alpha_q$ |
| | $A^{i,i+1} = 1; i \ne 1, 25, 193, 194, 195$ |
| F: 195 × 3 matrix | $F^{1,1} = \beta_d$ |
| | $F^{25,1} = \beta_w \cdot \beta_d$ |
| | $F^{193,1} = \beta_w \cdot \beta_d$ |
| | $F^{194,2} = \beta_d$ |
| | $F^{195,3} = \beta_q$ | and where $N_t^3 = [n_t^1, n_t^2, n_t^3]^T$, is a column vector with components $n_t^1$, $n_t^2$, $n_t^3$. The second equation in (6) may be written in terms of the components $x_t^i$; i=1, ..., 195 of $x_t$ as:

$$x_{t+1}^1 = \alpha_d x_t^1 + \beta_d n_t^1 \qquad (7)$$

$$= \beta_d (1 - \alpha_d B)^{-1} n_t^1$$

$$x_{t+1}^i = x_t^{i+1}$$

$$= B x_t^{i+1}; \quad i = 2, \ldots, 24$$

$$x_{t+1}^{25} = \alpha_d \beta_w x_t^1 + \alpha_w x_t^2 + \beta_w \beta_d n_t^1 \qquad (8)$$

$$= \alpha_w x_{t-23}^{25} + \beta_w x_{t+1}^1$$

$$= \beta_w (1 - \alpha_w B^{24})^{-1} x_{t+1}^1$$

-continued $$x_{t+1}^j = x_t^{j+1}$$

$$= Bx_{t+1}^{j+1} \quad i = 26, \ldots, 192$$

$$x_{t+1}^{193} = \alpha_d \beta_w x_t^1 + \alpha_w x_t^2 + x_t^{26} + \beta_w \beta_d n_t^1 \quad (9)$$

$$= x_{t-167}^{193} + x_{t+1}^{25}$$

$$= (1 - B^{168})^{-1} n_{t+1}^{25}.$$

Concatenating (7) and (8) we get $$x_{t+1}^{25} = \beta_w \beta_d (1 - \alpha_w B^{24})^{-1} (1 - \alpha_d B)^{-1} n_t^1 \quad (10)$$

$$= s_{t+1}^1,$$

so $x_{t+1}^{25}$ is identical with the variable $s_{t+1}^1$ of (1). Furthermore, concatenating (10) and (9) we get $$x_{t+1}^{193} = \beta_w \beta_d (1 - B^{168})^{-1}(1 - \alpha_w B^{24})^{-1}(1 - \alpha_d B)^{-1} n_t^1$$

$$= s_{t+1}^1,$$

so $x_{t+1}^{193}$ is identical with the variable $s_{t+1}^{norm}$ of (3). The remaining two components $x_{t+1}^{194}$ and $x_{t+1}^{195}$ of $x_{t+1}$ are easily seen to be identical with the variables $s_{t+1}^2$ and $s_{t+1}^3$ of (1). So the final equation for the signal $s_{t+1}$ of system (6) is $$s_{t+1} = Cx_{t+1}$$

$$= x_{t+1}^{193} + x_{t+1}^{194} + x_{t+1}^{195}$$

$$= s_{t+1}^{norm} + s_{t+1}^2 + s_{t+1}^3,$$

and the signal $s_{t+1}$ of system (6) is identical with the signal $s_{t+1}$ of (4), i.e. the input-output relation of the two systems is the same. The equations (6) give the state-space description of our signal $s_t$. The system of equations for the observed traffic variable $v_t$ differs from (6) only in the addition of the observation noise $N_t^o$.

$$v_t = Cx_t + N_t^o$$

$$x_{t+1} = Ax_t + FN_t^3. \quad (11)$$

This is the state space description of the system given in equations (1), (3), (4), and (5). The actual values of the constants $\alpha_w, \alpha_d, \alpha_q, \beta_w, \beta_d,$ and $\beta_q$ appearing in (1) and in Table 1 are $$\alpha_d = 0.2^{\frac{1}{24+1}} = 0.9377, \quad \beta_d = \sqrt{1 - \alpha_w^2} = 0.3474$$

$$\alpha_w = 0.2^{\frac{1}{7+1}} = 0.8178, \quad \beta_w = \sqrt{1 - \alpha_d^2} = 0.5755$$

$$\alpha_q = 0.2^{\frac{1}{6+1}} = 0.7946, \quad \beta_q = \sqrt{1 - \alpha_q^2} = 0.6071.$$

$\alpha_w, \alpha_d, \alpha_q,$ are all of the form $$0.2^{\frac{1}{x+1}},$$

where x=the number of hours in a day, the number of days in a week, and the number of hours in a quarter day, respectively. The value of the constant $\alpha_d$ is chosen to make the impulse response of the operator $[1-\alpha_d B]^{-1}$ in (7) decay to 20% of its initial value after 24 samples=one day. Similarly for $\alpha_q$. The value of $\alpha_w$ is chosen to make the impulse response of $[1-\alpha_w B^{24}]^{-1}$ in (8) decay to 20% of its initial value after 7×24=168 samples=one week. The value of $\beta_d$ is chosen to make the energy E of the impulse response of $\beta_d [1-\alpha_d B]^{-1}$ given by $$E = \beta_d^2 \cdot \sum_{i=0}^{\infty} \alpha_d^{2i} = \frac{\beta_d^2}{1 - \alpha_d^2}$$

equal to one. This will in turn make the variance of $x_{t+1}^1$ equal to one which in its turn will make the variance of $x_{t+1}^{25}$ approximately equal to one, see (8). Similar comments apply to $\beta_w$ and $\beta_q$. It is desired to make the variances of the disturbance processes $x_t^{25}=s_t^1$, $x_t^{194}=s_t^2$, and $x_t^{195}=s_t^3$ equal to one another (their common value is unimportant) so that their effect on the observed traffic variable $v_t$ will be equal. This will cause any observed disturbance in the variable $v_t$ to be classified as long, medium, or short term strictly on the basis on how long it persists, and not upon its magnitude.

The Kalman filter for the state space model (11) will update estimates $\hat{x}_t^{25}$, $\hat{x}_t^{194}$ and $\hat{x}_t^{195}$ for the three disturbance states at the same time as it updates its estimate $\hat{s}_t = \hat{x}_t^{193} = \hat{x}_t^{194} = \hat{x}_t^{195}$ of the complete traffic variation variable $s_t$. Our monitoring algorithm alarms whenever a normalized version of $\hat{x}_t^{25}$, our estimate of the state $x_t^{25}$ of the longest duration disturbance, exceeds a threshold. The precise way in which this is done is discussed below.

Summing up, the three major differences in problem formulation between the Kalman filter approach to ratio monitoring and the Box-Jenkins approach are:

1. The Kalman filter method assumes that the observed ratio value $v_{t+1}$ is not the signal itself $s_{t+1}$ but the signal upon corruption by the observation noise $\langle N_{t+1}^o \rangle$, i.e. $v_{t+1} = s_{t+1} = N_{t+1}^o$.

2. The "signal" $s_{t+1}$ in the Kalman filter model is modeled as the sum $s_{t+1} = s_{t+1}^{norm} + s_{t+1}^2 + s_{t+1}^3$ of the outputs of three Box-Jenkins type models.

3. The variable used for alarming in the Kalman filter method is not the forecast error $e_{t+1}$, but an estimate $\hat{x}_{t+1}^{25}$ of an internal state $\hat{x}_{t+1}^{25}$ of the model.

The approach for constructing alarms used by the present invention, as discussed above, is to choose a model for the complete ratio traffic variation process and use this model to estimate one or more quantities associated with the observed ratio values. An alarm is generated when any or some combination of these estimates exceed some threshold. As mentioned above, the estimate for alarming will be a scaled version of $\hat{s}_t^1 = \hat{x}_t^{25}$, the state estimate of the long term disturbance variable. The constant used for scaling $\hat{s}_t^1$ is an estimate of the standard deviation, or square root of the variance, of this estimate. Our use of Kalman filter theory is to compute both the estimate $\hat{s}_t^1$ and its variance.

We next explain how to go from the state-space model (11) to an estimate of the state vector $x_t$, and in particular the component $x_t^{25}$ of this vector. Since $x_t$ is updated by the equation $$x_{t+1} = Ax_t + FN_t^3, \quad (12)$$

it is plausible that $\hat{x}_t$ can be updated by an equation similar to this. However, the value of the signal noise $N_t^6$ is unobservable and must be replaced by an observed quantity in order to use (12) to update $\hat{x}_t$. The candidate chosen to replace $N_t^6$ in (12) is the forecast error $e_{t+1} = v_{t+1} - CA\hat{x}_t$, since it is observable and provides a measure of how close our estimate $\hat{x}_t$ is to $x_t$. However, the forecast error $e_{t+1}$ is a scalar, and for dimensional compatibility it must be multiplied by a vector $K_{t+1}$ before it can be substituted into (12). When we do this, equation (12) becomes $$\hat{x}_{t+1} = A\hat{x}_t + K_{t+1}(v_{t+1} - CA\hat{x}_t). \tag{13}$$

This gives a convenient class of estimators which is similar to (12) except that $\hat{x}_{t+1}$ in (13) is driven by the term $K_{t+1}(v_{t+1} - CA\hat{x}_t)$ rather than $FN_t^6$. However, the estimate $\hat{x}_{t+1}$ is still not uniquely determined until the column vector $K_{t+1}$ is specified. Kalman filter theory provides rules to use in the selection of $K_{t+1}$. The central result of this theory is that the least squares estimate $\hat{x}_t$ of the state vector $x_t$ of the linear system (11), given the observations $v_t, v_{t-1}, \ldots,$ satisfies the update equation (13) with the sequence of vectors $<K_t>$ given by the Kalman filter update equations (see Appendix A).

In addition to the equations for updating the state estimate $\hat{x}_t$, Kalman filter theory also provides recursive equations for computing the current value of the theoretical error covariance matrix $P_t$. (These equations appear as (A.3), (A.4) and (A.6) in Appendix A.) This matrix is equal to the covariance matrix of the state error vector $\hat{x} - x_t$ under the assumption that the state space model (11) is accurate. The quantity $P_t$ is independent of the observed data $v_t, v_{t-1}, \ldots$ and is determined solely by the model. This explains why it cannot be an estimate of the actual covariance matrix of the state error vector $x_t - \hat{x}_t$. It also explains why $P_t$ can be computed off-line before the actual execution of the Kalman filter algorithm as follows from equations (A.3), (A.4), and (A.6) in Appendix A.

The 25th diagonal element of the error covariance matrix, $P_t^{25,25}$ is the variance of the alarm variable $\hat{x}_t^{25}$, once again under the assumption that the state space model (11) is accurate. The actual variance of $\hat{x}_t^{25}$ is needed to construct the thresholds for alarming, or equivalently, in order to normalize $\hat{x}_t^{25}$ to have unit variance. In order to determine the actual variance of $\hat{x}_t^{25}$, or the actual error covariance matrix, $P_t$ must be scaled by a data dependent quantity. Before discussing how to do this, we will examine in a little more detail how $P_t$ and $K_t$ depend on our model parameters—in particular, the noise variances $\sigma^{o^2}$ and $\sigma^{s^2}$ and the initial value of $P_{t_0}$ of $P_t$ itself.

It may be verified from equations (A.3), (A.4), and (A.6) in Appendix A, that multiplying all of $\sigma^{o^2}$, $\sigma^{s^2}$, and $P_{t_0}$ by the same constant c has the effect of multiplying $P_{t_0}$ by c but does not alter the value of $K_t$. On the other hand, the value of $K_t$ does depend on the ratio $p^2 = \sigma^{s^2}/\sigma^{o^2}$ of the two noise variances. This ratio determines the transient behavior of the state estimate $\hat{x}_t$—if $p^2 \ll 1$, then $K_t \approx 0$ and the Kalman filter adapts slowly to changing ratio traffic patterns but yields a very accurate steady-state estimate for patterns which are themselves slowly changing.

On the other hand if $p^2 \gg 1$, then the filter adapts quickly to traffic pattern changes but yields a poorer estimate for slowly changing patterns. The approach adopted in the preferred embodiment is to "fix" the ratios $p^2$. The procedure for fixing the ratios $p^2$ is as follows—we first decide based on prior experience how quickly we want our algorithm to adapt to permanent changes in the pattern of the data. By "adapts" we mean that the algorithm stops issuing alarms and regards the new pattern as the established normal traffic pattern. We then determine experimentally, by running the algorithm on a stretch of data into which a permanent change (e.g., a step) in the pattern of the data has been introduced, what value of $p^2$ yields this rate of adaptation. The preferred embodiment currently adapts to step changes in about four weeks. Fixing $p^2$ yields a desirable rate of adaptation of the algorithm by taking $\sigma^{o^2}=1$ and $\sigma^{s^2}=p^2$ in our model, and then using the Kalman filter update equations for this model to compute $P_t$. This will yield the correct value of $P_t$ up to a multiplicative constant $\gamma_t^2$ so that we will have $$\gamma_t^2 P_t = E[e_t e_t^T] = E[(\hat{x}_t - x_t)(\hat{x}_t - x_t)^T]. \tag{14}$$

The right hand side of (14) is by definition the actual covariance matrix of our state vector estimate. In order to determine $\gamma_t^2$ from (14) we would like to be able to estimate directly from the observed ratio traffic data at least one component of the error $e_t = \hat{x}_t - x_t$, since this would allow us to estimate the corresponding component of the true error covariance matrix $E[e_t e_t^T]$. This is not possible, however, since we do not observe any components of the true state vector $x_t$. However, we do observe the "fit error" $\epsilon$ given by $\epsilon = v_t - C\hat{x}_t$, and by using the fact that the variance of this quantity is $$E[\epsilon^2] = \gamma_t^2(1 - CP_tC^T). \tag{15}$$

we may combine our observations of $\epsilon$ with our knowledge of $P_t$, to derive $\gamma_t^2$. We can then use $\gamma_t^2$ and equation (14) to determine completely the components of $E[(\hat{x}_t - x_t)(\hat{x}_t - x_t)^T]$. The (25,25)th component of this matrix is $\sigma_{e,25}^2 = \text{Var}[\hat{x}_t^{25}]$, the variance of our alarm statistic $\hat{x}_t^{25}$, and so the normalized variable $\beta_t$ given by $$\beta_t = \frac{\hat{x}_t^{25}}{\sigma_t^{25}} = \frac{\hat{x}_t^{25}}{\gamma_t \sqrt{P_t^{25,25}}}$$

will have unit variance and will be a suitable quantity with which to construct alarms—see Appendix D.

We now discuss the modifications and additions we have made to the core Kalman filter theory in order to turn it into a complete ratio alarming system. In particular, discussed below is how the following requirements, which must be addressed by any complete ratio alarming algorithm, are met within the context of Kalman filter theory:

Outlier Rejection
Step Treatment
Error Variance Estimation
Alarm Formation
Initialization
Missing Data Treatment Considering first Outlier Rejection, most common estimation techniques make no explicit provision for outliers but assume that outlier rejection has already been performed on the population under study, and that every measurement in the resulting sample is to be included and weighted equally in the production of an estimate. Outlier resection is therefore treated as an "add-on" to be performed before the application of the technique. This can pose a problem for methods like the Box-Jenkins forecasting method which require sample measurements distributed at regular intervals of either time or space. With these methods, extreme values which are thrown out must be replaced by something else. The state space model (11) used by the Kalman filter, however, is general enough to explicitly account for extreme values so that they may be used in the production of the estimate $\hat{x}_t$ without having to replace them with fictitious values.

This advantage of the invention is important because extreme values can indicate permanent changes in the pattern of the data as well as outliers. These changes must eventually be heeded by the estimation algorithm. The means by which one models extreme values using (11) is by increasing the variance $\sigma_t^{o^2}$ of the observation noise $N_t^o$ for any hour $t$ at which an extreme value is observed.

Recall that the Kalman filter produces at each hour $t$ the optimal estimate $\hat{x}_t$ of $x_t$ based on the observations $v_t, v_{t-1}, \ldots$ and knowledge of the state space model and the variances of the observation and state noise processes. Furthermore, the model and the noise variances are allowed to vary with time. This provides for enormous flexibility, but in the above embodiment the only component of the model which we have allowed to vary with time is the instantaneous variance of the observation noise. At any hour, we are free to set this at any value. In particular, if we set it to a large value at the hour t+1, at which an extreme value is observed, then the filter will assign most of the discrepancy between the observed ratio value $v_{t+1}$ and the forecast value $C\bar{x}_{t+1}$ to the observation noise and weigh the observation lightly in computing its update of the state estimates. This can be seen clearly from the update equations in Appendix A—an increase in $\sigma_{t+1}^{o2}$ in equation (A.4) results in a decrease in the size of the components of $K_{t+1}$, which in turn results in the current value $v_{t+1}$ (=$v_{t+1}-C\bar{x}_{t+1}$) of the innovations process (see Appendix A for definition) being weighed less heavily in the update equation (A.5) for $\hat{x}_{t+1}$.

The exact formulas for the preferred outlier rejections method are given in Appendix B. In particular, Appendix B presents the formula used to increase the variance of the observation noise at the hour an extreme value is observed as well as the definition of "extreme value" that is used for this purpose.

Step treatment is the requirement that any ratio monitoring algorithm be able to adapt to permanent changes in the observed data pattern. The step treatment requirement is in conflict with the outlier rejection requirement since the former requires that the estimation algorithm pay attention to extreme data values whereas the latter requires that it not pay attention to them.

Step treatment is not implemented as a separate step in the invention. Instead, it is incorporated in the way outlier rejection is handled. As explained above, rather than make a yes-or-no decision about whether an extreme value is an outlier and hence to be excluded from the estimation process, it is weighed by an amount that automatically increases the longer a new pattern of values persists. This allows the filter to eventually adapt to steps and other pattern changes. Also, the Kalman filter method never needs to fit a new model to the data after a pattern change because it is robust enough to monitor, with a fixed model.

Estimation of the fit error variance is equivalent to estimation of $\gamma_t^2$ since the two are related by equation (15). Estimation of one of these quantities is necessary in order to scale the value of the theoretical error covariance variance matrix $P_t$ produced by the Kalman filter algorithm. This is in turn necessary to produce an estimate of the actual (unscaled) variance of the alarm variable $\hat{x}_t^{25}$, so that the normalized alarm variable $\beta_t$ (with unit variance) can be formed according to (D.1) in Appendix D.

We estimate $\gamma_t^2$ using a simple Kalman filter for estimating a constant offset in noise. The equations are given in Appendix C. In the absence of an extreme value this filter will converge to a simple filter with constant coefficients. The reason we implement our $\gamma_t^2$ estimator as a Kalman filter rather than as the simple filter it converges to in the steady state is to prevent this estimate from blowing up in case of extreme values in the ratio data. This is done by treating extreme values as missing data and eliminating them entirely from the estimation of $\gamma_t^2$. This is discussed in more detail in Appendix C.

Considering alarm formation, after the estimate $\hat{x}_{t+1}^{25}$ has been formed according to the equations in Appendices A and B and the scaling constant $\gamma_{t+1}$ has been formed according to the equations in Appendix C, the former is scaled by the latter to produce the alarm variable $\beta_{t+1}$. If the magnitude of $\beta_{t+1}$ exceeds a threshold, then an alarm is issued. The formulas for this are given in Appendix D.

We now consider initialization of the system. During the first iteration of the algorithm, $t=t_0$ to in the update equations (A.1)–(A.6), (B.1)–(B.4), and (C.1)–(C.6) appearing in Appendices A, B, and C, and the quantities $\hat{x}_{t_0}, P_{t_0}, \gamma_{t_0}^2$, and $p_{t_0}$ appearing on the right hand sides of these equations must be initialized. The initial values for these quantities are $\hat{x}_{t_0}=0$ $P_{t_0}=1000 \cdot I$ $\gamma_{t_0}^2=0$ $p_{t_0}=1000$.

The values of $\hat{x}_{t_0}$ and $\gamma_{t_0}^2$ are more or less arbitrary, but $P_{t_0}$ and $p_{t_0}$ are chosen to be large (>>1) so that the system will weigh the initial observed ratio values $v_{t_0+i}$ heavily and adapt quickly (in a matter of a few hours) to the observed data (see equations (A.3), (A.4), and (A.5) in Appendix A).

Similarly, $P_{t_0}$ is chosen to be large so that $\gamma_{t_0}$ will adapt quickly to the data. Also, as can be seen from the conditions in the "if" blocks surrounding (B.2) in Appendix B and (C.4)–(C.6) in Appendix C, outlier rejection is turned off and $\gamma_t^2$ is turned on for this first iteration.

Initialization is done only at the beginning of a run. There is never a need to reinitialize once the system has started.

Missing data treatment is next addressed. The ratio time series have real number values at each hour. However, CDRM will occasionally pass a value that is difficult to interpret as a ratio of MLSS to tracer values, usually because it is very large. It is thought that CDRM may be implementing its own form of outlier rejection or missing data treatment which is causing these values to be large. From the point of view of this invention it would be preferable if CDRM did not fill in these missing values but instead passed along the information that these hours contain no data, perhaps by setting the corresponding ratios equal to a negative number. This is because the Kalman filter works and is optimal even on time series with missing data and nothing is gained by inserting fictitious values into the data stream.

The invention may be modified to work on time series with missing data. The operation of the algorithm for any hour in which a ratio value is available would be identical to what it was before. For the remaining hours in which data is missing the algorithm would have to be modified as follows.

In the Kalman Filter Update Equations (Appendix A), steps (A.2) and (A.4) are omitted, and steps (A.5) and (A.6) are replaced by (A.5') and (A.6') given by; respectively:

$$\hat{x}_{t+1}=\bar{x}_{t+1} \qquad (A.5')$$

$$P_{t+1}=H_{t+1} \qquad (A.6')$$

Step (B.1) is omitted and the condition in the "if" block surrounding (B.2) is considered to be false so that $\Delta\sigma_{t+1}^{o2}$ is set equal to zero. Finally, steps (C.1) and (C.2) are omitted and the formula $$\gamma_{t+1}^2=\gamma_t^2$$

is used for updating $\gamma_{t+1}^2$ in place of the "if" block surrounding equations (C.2), (C.3), and (C.4).

The invention has been described above in the context of the monitoring of call detail recording, and specifically the monitoring of a ratios timeseries. However, the preceding description is merely an illustration of the invention and the invention finds wide applicability in other environments. Many modifications and applications will be apparent to those skilled in this art.

For example, in the environment of CDRM, the invention may be used to analyze other types of data to detect recording errors. So called "volumes" data can be analyzed with the Kalman filtering methods described above.

Furthermore, the invention finds applicability to environments other than CDRM. As one example, the invention finds applicability for fraud detection in telephone networks by alarming on unusual increases in calling volume arising from theft of service by illegally tapping into a telephone line of by using a stolen calling card.

Appendix A

The Kalman Filter Update Equations

The signal generation model used in this paper has been given in (11):

$$v_t = Cx_t + N_t^o$$

$$x_{t+1} = Ax_t + FN_t^s.$$

where $$E[N_t^{o2}] = \sigma_t^{o2}$$

$$E[N_t^s N_t^{sT}] = \sigma^{s2} \cdot I.$$

The Kalman filter is concerned with updating four quantities related to this model:

State Estimate: $\hat{x}_t = E[x_t | v_t, v_{t-1}, \ldots]$

State Forecast: $\bar{x}_t = E[x_t | v_{t-1}, v_{t-2}, \ldots]$

State Estimate Error Covariance: $P_t = E[(\hat{x}_t - x_t)(\hat{x}_t - x_t)^T]$ State Forecast Error Covariance: $H_t = E[(\bar{x}_t - x_t)(\bar{x}_t - x_t)^T].$ Strictly speaking, the expressions above for $\hat{x}_t$ and $\bar{x}_t$ as conditional expectations hold only if the signal and observation noise processes $<N_t^s>$ and $<N_t^o>$ are Gaussian. $\hat{x}_t$ and $\bar{x}_t$ will always be least squares estimates, however.

At hour t+1 a new ratios measurement $v_{t+1}$ becomes available and the above quantities are updated in the following sequence for all $t \geq t_0$:

$$\bar{x}_{t+1} = A\hat{x}_t \quad (A.1)$$

$$V_{t+1} = v_{t+1} - C\bar{x}_{t+1} \quad (A.2)$$

$$H_{t+1} = AP_t A^T + \sigma^{s2} FF^T \quad (A.3)$$

$$K_{t+1} = H_{t+1} C^T / (CH_{t+1} C + \sigma_{t+1}^{o2}) \quad (A.4)$$

$$\hat{x}_{t+1} = \bar{x}_{t+1} + K_{t+1} V_{t+1} \quad (A.5)$$

$$P_{t+1} = (I - K_{t+1} C) H_{t+1} \quad (A.6)$$

Equation (A.2) defines the innovations sequence $V_t$ which, as mentioned in section 2, is a white noise process independent of the past observations $v_t, v_{t-1}, \ldots$, and hence independent of $\bar{x}_{t+1}$. $V_{t+1}$ contains the new information about the state $x_{t+1}$ which has become available with the observation $v_{t+1}$ at hour t+1, and so the value of the Kalman gain matrix $K_{t+1}$ will determine how we weigh this new information. In case $v_{t+1}$ is an outlier we will want $K_{t+1}$ to be small and have discussed a device for doing this. The steps (A.1) and (A.3) can be programmed very efficiently by using the fact that A is "almost" a left-shift matrix in the sense that the multiplication of the state estimate vector $\hat{x}_t$ by A has the effect of shifting most of the components of $\hat{x}_t$ one unit to the left, i.e. $(A\hat{x}_t)^i = \hat{x}_t^{i+1}$ for all $i \neq 1, 25, 193, 194, 195$. So if we let the logical arrays representing $\hat{x}_t$ and $\bar{x}_t$ occupy the same physical array x in memory, then we may perform step (A.1) above "in place" by incrementing two pointers, each pointing into a separate subarray of x, together with a few additional multiplications and additions. Some C-like code for doing this is given here:

```
int ptr 1,ptr 2;
float x[195];

for(hour = 0 ; ; hour++) { ptr1 = hour%24+1;                                    (1)
    ptr2 = hour%168+25;                                  (2)
    x[0] = α_d * x[0];                                   (3)
    x[ptr1] = α_w * x[ptr1] + β_w * x[0];                (4)
    x[ptr2] = x[ptr2] + x[ptr1];                         (5)
    x[193] = α_d * x[193]                                (6)
    x[194] = α_q * x[194]                                (7)
```

The for loop here is the main loop of our monitoring algorithm. It increments the variable "hour" (representing the time index) and loops through all the equations in Appendices A–D. The steps corresponding to equation (A.1) are given in lines (1)–(7) above. Here x is an array representing both $\hat{x}_t$ and $\bar{x}_{t+1}$ in equation (A.1)—more exactly, at the (t+1)'th iteration of the loop (hour=t), and before the execution of (1), x contains the values of $\hat{x}_t$, while after the execution of (7), x contains the values of $\bar{x}_t$. Before the execution of (1), the integer "ptr1" points to the location within the x array containing the value of the state estimate $\hat{x}_t^{25}$ of the long term disturbance variable $s_t^l = x_t^{25}$, and the integer "ptr2" points to the location within x containing the value of the state estimate $\hat{x}_t^{193}$ of the normal traffic variation variable $s_t^{norm} = x_t^{193}$. As can be seen from (1) above, ptr1 is incremented by one on each pass through the loop, except on a pass following one in which it equals its upper limit (=24) at which time it wraps around to its lower limit (=1). Similarly, ptr2 is incremented until a pass following one in which it equals its upper limit (=192) at which time it wraps around to its lower limit (=25).

The "in place" implementation of step (A.3) above is a little more complicated, but is still much more efficient than a direct implementation using matrix multiplications. The C-like code for performing step (A.3) is given here:

```
float **P;

P = (float**) calloc(195,sizeof(float*));
for (i=0;i<195;i++) P[i] = (float*)calloc(i+1,sizeof(float));

for (hour = 0 ; ; hour++) {

P[0][0] = α_d^2 * P[0][0] + β_d^2 * σ^2                (8)
    for (i=1;i<195;i++) P[i][0] = α_d * P[i][0];           (9)
    P[ptr1][ptr1] =                                        (10)
```

-continued $$\alpha_w^2 * P[ptr1][ptr1] + 2*\alpha_w*\beta_w*P[ptr1][0] + \beta_w^2*P[0][0];$$
for $(i=0; i<ptr1; i++)$ $P[ptr1][i] =$ (11)

$$\alpha_w*P[ptr1][i] + \beta_w*P[ptr1][0];$$
for $(i=ptr1+1; i<195; i++)$ $P[i][ptr1] =$ (12)

$$\alpha_w*P[i][ptr1] + \beta_w*P[ptr1][0];$$
$P[ptr2][ptr2] =$ (13)

$$P[ptr2][ptr2] + 2*P[ptr2][ptr1] + P[ptr1][ptr1];$$
for $(i=0; i<ptr1; i++)$ $P[ptr2][i] = P[ptr2][i] + P[ptr1][i];$ (14)
for $(i=ptr1; i<ptr2; i++)$ $P[ptr2][i] = P[ptr2][i] + P[i][ptr1];$ (15)
for $(i=ptr2+1; i<195; i++)$ $P[i][ptr2] =$ (16)

$$P[i][ptr2] + P[i][ptr1];$$
$P[193][193] = \alpha_d^2*P[193][193] + \beta_d^2*\sigma^2$ (17)
for $(i=0; i<193; i++)$ $P[193][i] = \alpha_d*P[193][i];$ (18)
$P[194][193] = \alpha_d*P[194][193];$ (19)
$P[194][194] = \alpha_q^2*P[194][194] + \beta_q^2*\sigma^2$ (20)
for$(i=0; i<194; i++)P[194][i] = \alpha_q*P[194][i];$ (21)

The for loop here is the same as above, and the variables ptr1 and ptr2 are the same also. The lines (8)–(21) above are to be inserted after the lines (1)–(7). These lines implement the step (A.3). Here P is a matrix (a pointer to an array of pointers—C's version of a matrix) representing both of the logical matrices $P_t$ and $H_{t+1}$ in (A.3). At the (t+1)'th iteration of the loop (hour=t), and before the execution of (8) above, P contains the values of $P_t$ while after the execution of (21), P contains the values of $H_{t+1}$. The matrices $P_t$ and $H_{t+1}$ are symmetric, and so $P[i][j]$ only has to be declared and defined for $i \geq j$. So in order to reduce memory usage, we allocate storage only for the subdiagonal elements of P. This can be seen in the statements which precede the for loop above.* In the lines (8)–(21) we must be careful to ensure that the index i always points to an allocated portion of memory. So, for example, lines (11) and (12) cannot be merged into the following single for loop:

for (i=0;i<195;i++) P[ptr1][i]=α_w*P[ptr1][i]+β_w*P[ptr1][0];

because for i>ptr1, P[ptr1][i] references an unallocated portion of memory. Nor can we write lines (14), (15) and (16) as a single loop, nor (18) and (19).

Due to our "in place" implementation of steps (A.1) and (A.3), the index pointing to a given value within the physical array x is in general not the same as the index pointing to the same value within the logical array $\hat{x}_t$ or $\bar{x}_t$, i.e. in general $x[i] \neq \hat{x}_t^{i+1}$ at the top of the loop for values of i between 1 and 192 inclusive. Likewise $P[i][j] \neq P_t^{i+1,j+1}$ at the top of the loop for values of i and j ($j \leq i$) within this same range. Instead, the correspondence between the indices for the physical arrays and those for the logical arrays is given in terms of the indexed sequence $p_i$, i=0, . . . , 194 defined as follows:

$$p_i = \begin{cases} (i-1+\text{hour})\%24+1 & \text{if } 1 \leq i \leq 24 \\ (i-25+\text{hour})\%168+25 & \text{if } 25 \leq i \leq 192 \\ i & \text{if } i = 0, 193, 194 \end{cases}$$

Then at the top of the loop we have $x[p_i] = \hat{x}_t^{i+1}$ and $P[p_i][p_j] = P_t^{i+1,j+1}$ for i and j lying between 0 and 192 inclusive ($j \leq i$). It is not necessary to know this—the program will automatically maintain the correct relationship between the indices. The same correspondence also holds between the indices of any of the physical arrays within our program and the corresponding logical array which it represents. In particular, it holds for the physical arrays representing the logical arrays $K_{t+1}$ and $P_{t+1}$ appearing in (A.4)–(A.6) above.

Appendix B

Supplementary Equations for Outlier Rejection

The following equations ar the equations which are added to the update equations (A.1)–(A.6) in order to implement outlier rejection:

insert between (A.3) & (A.4)
$$\begin{cases} \sigma_{t+1}^{v2} = CP_{t+1}C^T + 1 & \text{(B.1)} \\ \text{if } [|v_{t+1}| > T_{thres} \cdot \gamma_{t+1} \cdot \sigma_{t+1}^v \text{ and } t > t_0] \\ \Delta\sigma_{t+1}^{o2} = \left(\frac{v_{t+1}}{T_{thres} \cdot \gamma_{t+1}}\right)^2 - \sigma_{t+1}^{v2} & \text{(B.2)} \\ \text{else } \Delta\sigma_{t+1}^{o2} = 0 \\ \sigma_{t+1}^{o2} = 1 + \Delta\sigma_{t+1}^{o2} & \text{(B.3)} \\ \sigma_{t+1}^{v2} = \sigma_{t+1}^{v2} + \Delta\sigma_{t+1}^{o2} & \text{(B.4)} \end{cases}$$

The variables above which have not been previously defined in Appendix A have the following interpretation in term of our model (11):

Variance of Innovations Sequence: $\sigma_t^{v2} = E[V_t^2]$

Increase in Observation Noise Variance due to Extreme Value: $\Delta\sigma_t^{o2}$ Observation Noise Variance: $\sigma_t^{o2}$ Scaling Constant for Alarm Variable: $\gamma_t^2$ Equation (B.1) updates the variance $\sigma_{t+1}^{v2}$ of the innovations sequence and the if block (B.2) combided with equations (B.3), (B.4) increases the variances of the observation noise $N_{t+1}^o$ and the innovations sequence if the observed ratio value $v_{t+1}$ is extreme. This performs a kind of outlier rejection by decreasing the effect of the current observation $v_{t+1}$ on the state estimate $\hat{x}_{t+1}$ as discussed above.

The update equations for the scaling constant $\gamma_t^2$ are given in Appendix C.

Appendix C

Supplementary Equations for $\gamma_t$ Estimation

The following equations are the equations which are added to the equations (A.1)–(A.6) in Appendix A and the equations (B.1)–(B.4) in Appendix B in order to estimate $\gamma_t^2$:

insert after (A.6)
$$\begin{cases} p_{t+1} = p_t + 1 & \text{(C.1)} \\ \text{if}(|v_{t+1}| < 2 \cdot \gamma_t \sigma_{t+1}^v \text{ or } t = t_0) \{ \\ k_{t+1} = \frac{p_{t+1}}{p_{t+1} + \frac{1-\alpha}{\alpha^2}} & \text{(C.2)} \\ \gamma_{t+1}^2 = \gamma_t^2 + k_{t+1}((v_{t+1}/\sigma_{t+1}^v)^2 - \gamma_t^2) & \text{(C.3)} \\ p_{t+1} = p_{t+1}(1 - k_{t+1}) & \text{(C.4)} \\ \} \end{cases}$$

The equation (C.1) together with the if block updates $\gamma_{t+1}^2$ using a simple Kalman filter with state space model given by:

$$v_t = x_t + n_t^o; \quad E[n_t^{o2}] = \frac{(1-\alpha_\gamma)^2}{\alpha_\gamma}$$ (C.5)

$$x_{t+1} = x_t + n_t^s; \quad E[n_{t+1}^{s2}] = 1,$$

where the value of $\alpha_\gamma$ is $$0.20 \frac{1}{168+1}.$$

(The quantities appearing in (C.5) are not to be confused with any of the quantities appearing in (11)).

Equation (C.1) corresponds to equation (A.3) in Appendix A, equation (C.2) corresponds to equation (A.4), equation (C.3) corresponds to equation (A.5), and equation (C.4) corresponds to equation (A.6). The steps (C.2)–(C.4) are located inside an if statement and are only executed if the condition of this statement is satisfied. This condition checks to see that the fir error $e_{t+1}$ is not too large, or equivalently, that the observed ratio value $v_{t+1}$ is not too large. Provided this is always the case and the steps (C.2)–(C.4) are always executed, the gain $k_{t+1}$ in (C.2) will converge to $t^{\to \infty}$ to $1-\alpha$ and in the steady state equation (C.3) will read $$\gamma_{t+1}^2 = \alpha_\gamma \cdot \gamma_t^2 + (1 - \alpha_\gamma) \cdot \left( \frac{v_{t+1}}{\sigma_{t+1}^v} \right)^2 \qquad (C.6)$$

This is a single pole filter with input $(V_{t+1}/\sigma_{t+1}^V)^2$ and output $\gamma_{t+1}^2$.

Appendix D

Supplementary Equations for Alarm Formation

After all the update steps in Appendices A, B, and C have been performed for hour t+1 the scaled alarming variable $\beta_t$ is computed as $$\beta_{t+1} = \frac{x_{t+1}^{25}}{\gamma_{t+1} \sqrt{p_{t+1}^{25,25}}} \qquad (D.1)$$

and an alarm signal is given if $$|\beta_{t+1}| > \text{THRESHOLD}$$

where THRESHOLD is a fixed constant representing the threshold for alarming. THRESHOLD could conceivably be different for different switch/service combinations.

Appendix E

The General Kalman Filter Monitoring Algorithm

In the body of this application and the preceding appendices we have described the ratios monitoring algorithm and given some of the details of its implementation. In this section we will give a complete description of the general Kalman filter monitoring (GKFM) algorithm. This algorithm reads at run-time an ARI (auto-regressive integrated) type model (we will give a precise definition below) for one or more time series from a configuration file, converts this model to a state space model, estimates the states of this state space model with the corresponding Kalman filter, compares one or more of these states with preset thresholds, and issues alarms if these thresholds are exceeded. When configured with the ratios model detailed in the body of the application this algorithm is functionally equivalent with the algorithm described there.

E.1 The Class $\Psi$ of Models

In this secton we will specify the types of models our algorithm will accept. We will call this class $\Psi$. The class $\Psi$ may be generated from a sequence of single channel mutually uncorrelated noise processes, $n^i$, $i=1, \ldots$; $E[n_t^i n_s^j] =$ $\delta_{ts}\delta_{ij}$, using the following rules (the symbol $\delta_{nm}$ is defined to be 0 if $n \neq m$ and 1 if $n=m$)

1. $n^i \in \Psi$

For each i, the process $n^i$ belongs to $\Psi$.

2. Closure Under Vector Join

If the N channel process $x=(x^1, \ldots, x^N)$ and the M channel process $w=(w^1, \ldots, w^M)$ both belong to $\Psi$, and if they share no common noise component, i.e. for no i,j,k do we have $x^i=w^j=n^k$, then the N+M channel process $$\eta=(x^1, \ldots, x^N, w^1, \ldots, w^M)$$

belongs to $\Psi$.

3. Closure Under Parallel and Serial Realizations

If the N channel process $x=(x^1, \ldots, x^N)$ belongs to $\Psi$, and if $$\phi(z) = 1 - \sum_{i=1}^{p} \alpha_i z^i$$

is an arbitrary AR polynomial (a polynomial with constant coefficient equal to one), then the N+1 channel process $\eta=(\eta^1, \ldots, \eta^{N+1})$ with components $\eta^i=x^i$, $i=1, \ldots, N$ and $$\eta^{N+1} = \phi^{-1}(B) \left[ \sum_{i=1}^{N} \beta_i x^i \right] \qquad (E.1)$$

belongs to $\Psi$, where the $\beta_i$ are arbitrary real numbers. We call the $\beta_i$ gain coefficients.

For example, consider the system of equations $$\begin{aligned}
s^1 &= \beta_1 (1 - \alpha_1 B)^{-1} n^1 \\
s^2 &= \beta_2 (1 - B^{24})^{-1} s^1 = \beta_2 \beta_1 (1 - B^{24})^{-1} (1 - \alpha_1 B)^{-1} n^1 \\
s^3 &= \beta_3 (1 - \alpha_3 B)^{-1} n^3 \\
s^4 &= \beta_4 (1 - B^{24})^{-1} s^3 = \beta_4 \beta_3 (1 - B^{24})^{-1} (1 - \alpha_3 B)^{-1} n^3 \\
s^5 &= \beta_5 (1 - \alpha_5 B)^{-1} n^5 \\
s^6 &= \beta_6 (1 - \alpha_6 B)^{-1} n^6 \\
o^1 &= s^2 + s^4 + s^5 + \beta_7 n^7 \\
o^2 &= s^2 - s^4 + s^6 + \beta_8 n^8
\end{aligned} \qquad (E.2)$$

This system defines a multi-channel process $\eta$ belonging to $\Psi$ which can be built by successive application of the rules 1–3:

| | Rule |
|---|---|
| $n^1$ | 1 |
| $\downarrow$ | 3 |
| $(n^1, s^1)$ | |
| $\downarrow$ | 3 |
| $(n^1, s^1, s^2)$ | |
| $\downarrow$ | 1,2 |
| $(n^1, s^1, s^2, n^3)$ | |
| $\downarrow$ | 3 |
| $(n^1, s^1, s^2, n^3, s^3)$ | |
| $\downarrow$ | 3 |
| $(n^1, s^1, s^2, n^3, s^3, s^4)$ | |
| $\downarrow$ | 1,2 |
| $(n^1, s^1, s^2, n^3, s^3, s^4, n^5)$ | |
| $\downarrow$ | 3 |
| $(n^1, s^1, s^2, n^3, s^3, s^4, n^5, s^5)$ | |
| $\downarrow$ | 1,2 |
| $(n^1, s^1, s^2, n^3, s^3, s^4, n^5, s^5, n^6)$ | |
| $\downarrow$ | 3 |
| $(n^1, s^1, s^2, n^3, s^3, s^4, n^5, s^5, n^6, s^6)$ | |
| $\downarrow$ | 1,2 |
| $(n^1, s^1, s^2, n^3, s^3, s^4, n^5, s^5, n^6, s^6, n^7)$ | |
| $\downarrow$ | 3 |
| $(n^1, s^1, s^2, n^3, s^3, s^4, n^5, s^5, n^6, s^6, n^7, o^1)$ | |
| $\downarrow$ | 1,2 |

-continued

| | Rule |
|---|---|
| $(n^1, s^1, s^2, n^3, s^3, s^4, n^5, s^5, n^6, s^6, n^7, o^1, n^8)$ <br> $\downarrow$ <br> $\eta = (n^1, s^1, s^2, n^3, s^3, s^4, n^5, s^5, n^6, s^6, n^7, o^1, n^8, o^2)$ | 3 |

This process also has a representation has a directed acyclic graph, or DAG, as does any process belonging to $\Psi$. The DAG for (E.2) is shown in FIG. 4.

Figure 4:
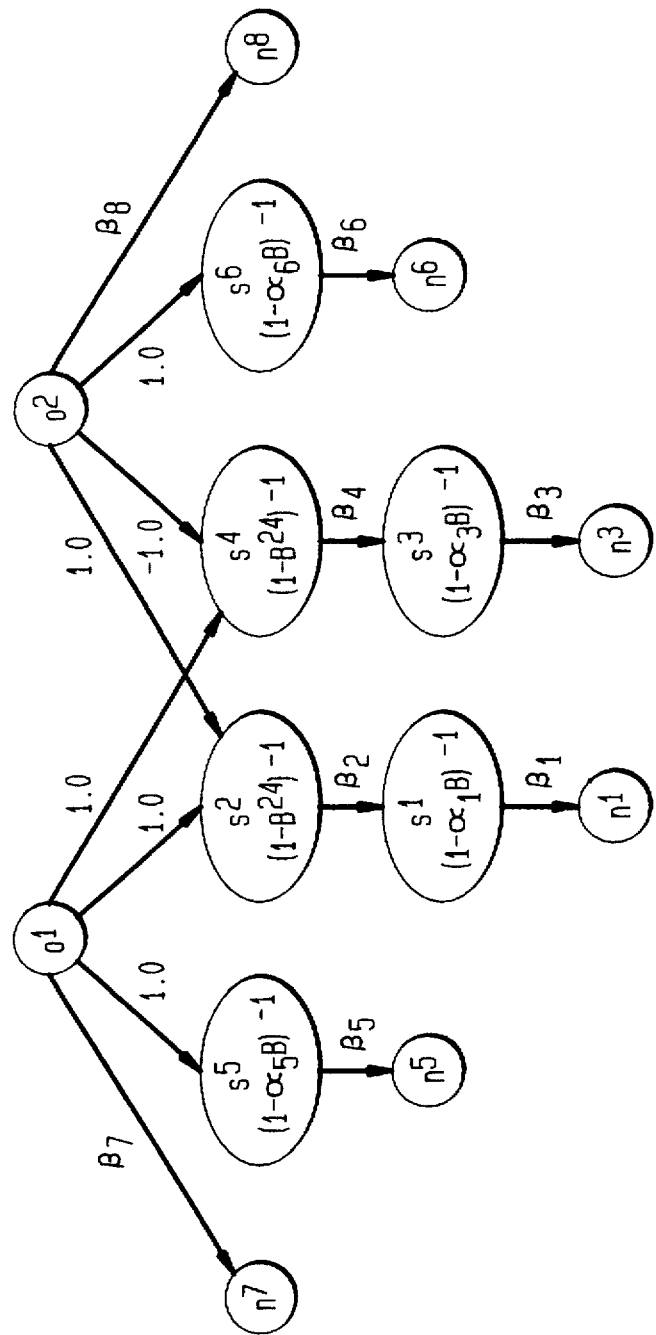
FIG. 4 is a directed acyclic graph used in connection with the preferred embodiment.
Figure 6:
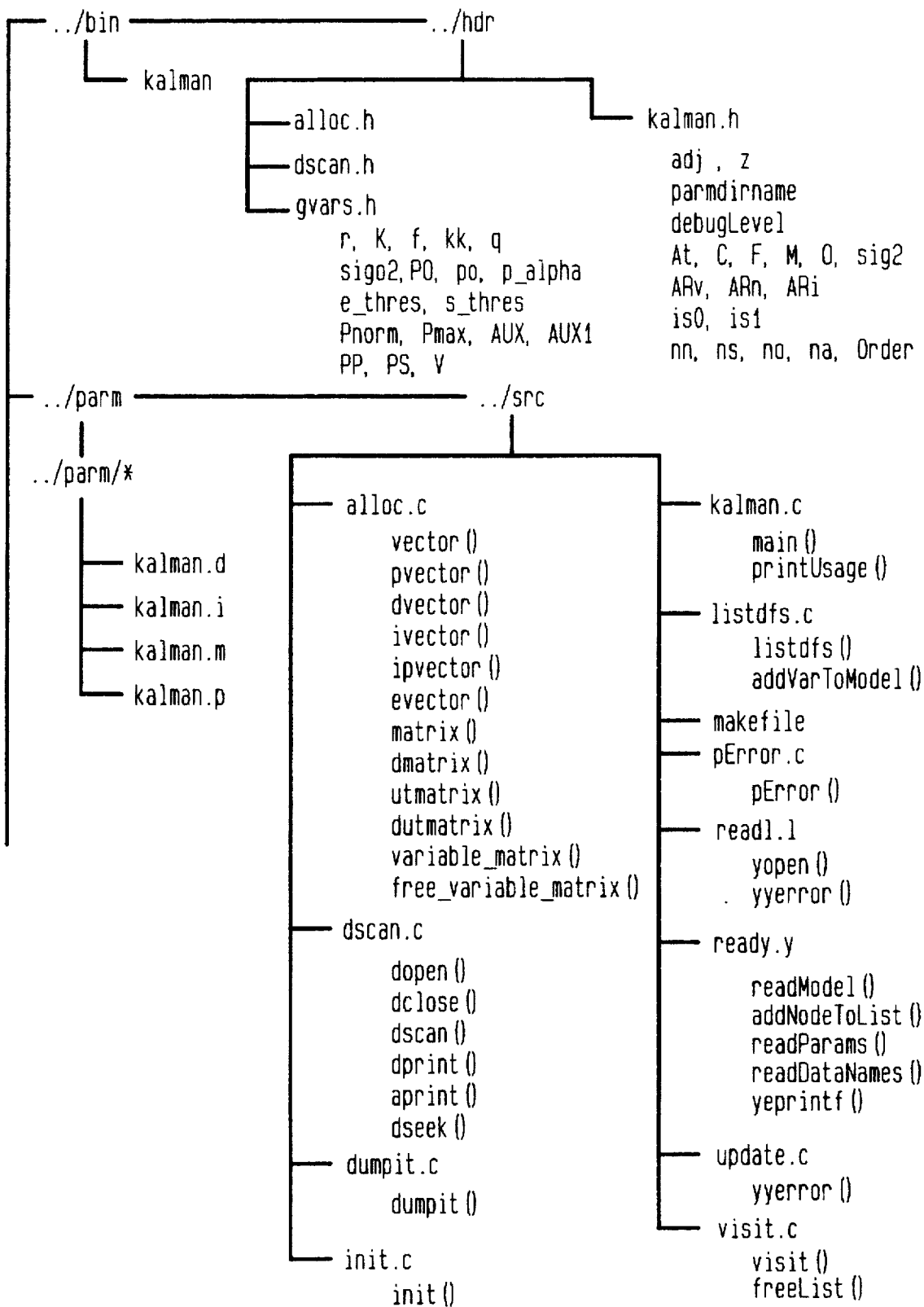
FIG. 6 is a directory tree associated with the monitoring method of the preferred embodiment of the invention.

The ellipses and circles appearing in FIG. 4 are the nodes of the DAG and the arrows are the directed edges. The nodes and directed edges also contain certain additional information. For example, the directed edge leading from $s^2$ to $s^1$ contains the value of the gain coefficient $\beta_2$ and the $s^2$ node contains the autoregressive operator $(1-B^{24})^{-1}$. Let us explain how this DAG may be built from the equations (E.2). Each application of Rule 1 in forming the equations (E.2) gives rise to a leaf node and each application of Rule 3 gives rise to a non-leaf node. A leaf of a directed graph is a node which has no directed edges leading from it. Similarly, a root is a node which has no directed edge leading into it.

The name attached to a leaf node is the name of the corresponding noise process ($n^i$ in Rule 1) and the name attached to a non-leaf node is the name of the single-channel process playing the role of ZN+1 in equation (E.1). In addition, any non-leaf node has attached to it the value of the AR operator playing the role of $\phi$ in equation (E.1), except in the case where $\phi$ is trivial, i.e. $\phi \equiv 1$, when we do not write this operator explicitly, e.g. $o^1$ and $o^2$ above. A non-leaf node has one directed edge leading from it for every non-zero coefficient $\beta_i$ appearing in the sum on the right hand side of (E.1). The directed edge corresponding to the coefficient $\beta_i$ leads to the node for the single channel process playing the role of $x^i$ in (E.1).

The roots of our directed graph are the variables $o^1$ and $o^2$ and the leaves are the variables $n^1, \ldots, n^6$. We will call the roots of the DAG corresponding to any process in $\Psi$ observation variables since we will think of them as measured or monitored variables in a physical system, and we will call the leaves noise variables since we will think of them as disturbances to our physical system. We will call any node which is neither a leaf nor a root a state variable.

The first step in our monitoring algorithm is to estimate the values and standard deviations of the state variables from a knowledge of the past and present values of the observation variables. In order to apply Kalman filter theory to this problem it is necessary to be able find state space representations for processes in $\Psi$. We turn to this in the next section.

E.2 A State Space Model for Processes in $\Psi$

In (11) (see also Appendix A) we presented the form of the state space equations used for the ratios monitoring algorithm. The form of the state space equations used for the GKFM (general Kalman filter monitoring) algorithm are similar:

$$o_t = C_t x_t + \sigma N_t^o. \qquad \text{(E.3.a)}$$

$$x_{t+1} = A_t x_t + F_t N_t \qquad \text{(E.3.b)}$$

Note the differences between (11) and (E.3.a,b)—the system matrices $A_t$, $F_t$, and $C_t$ in (E.3.a,b) are dependent upon the time index t, the observation noise $N_t^o$ in (E.3.a) is now multiplied by a gain matrix $\sigma$, and the observation $o_t$ can be a vector, unlike $v_t$ in (11). The components of $o_t$ will be the individual monitored data streams, e.g. $o^1$ and $o^2$ in FIG. 4. We will construct a state space model of type (E.3.a,b) for certain processes in the class $\Psi$ on which we intend to run our GKFM algorithm. In order that this state space model have certain desirable properties, it is necessary to impose some conditions on our DAG. The conditions we impose are 1. The DAG should contain at least one state variable, i.e. a node which is neither a root nor a leaf.
2. The DAG should be connected (when viewed as an undirected graph).
3. Each node should have at most one directed edge leading to a noise variable (leaf).
4. Each observation variable (root) should have exactly one directed edge leading to a noise variable (leaf). Furthermore, the AR operator $\phi$ attached to each observation variable should be trivial, i.e. $\phi \equiv 1$.
5. No noise variable should be have more than one directed edge leading to it.

It is clear that the DAG of FIG. 4 satisfies these properties. Let us now assume that we have a DAG satisfying conditions 1–4 and try to construct a state space model for its nodes. Every non-root, non-leaf node, i.e. every node corresponding to a state variable $s^k$ yields an equation of the form $$s^k = \phi^{-1}(B) \left[ \sum_{i \neq k} \beta_{k,i} s^i + \gamma_k n^k \right]$$

where the $\beta_{k,i}$ are the gain coefficients attached to the edges which lead from $s^k$ to the other nodes $s^i$ in the DAG, and where $\gamma_k$ is the gain coefficient attached to the directed edge which leads from $s^k$ to $n^k$ (or zero if there is no such directed edge). This equation can be rewritten as $$s^k = \alpha_{k,0} s^k - D_k + \sum_{i=1}^{D_k - 1} \alpha_{k,i} s^k_{t-i} + \sum_{\substack{i=1 \\ i \neq k}}^{M} \beta_{k,i} s^i + \gamma_k n^k \qquad \text{(E.4)}$$

where M is the number of state variables in the graph and where $D_k$ and $\alpha_{k,i}$, i=0, ..., $D_k$−1 are the order and non-constant coefficients, respectively, of the polynomial $$\phi(z) = 1 - \alpha_{k,0} z^{D_k} - \sum_{i=1}^{D_k - 1} \alpha_{k,i} z^i.$$

We can encounter a problem if we try to use equation (E.4) to update the value $s_t^k$ of the k-th state variable since the second sum on the right hand side of this equation involves already updated values $s_t^i$ of the other state variables and unless our original equations are in the correct order these values will not be available. In this respect the DAG representation of the process (E.2) is superior to its representation as a system of equations since the former allows us to immediately read off the the dependency relations of the variables $s^1, \ldots, s^6, o^1, o^2$. Extracting this dependency information from the original list of equations (E.2) is more difficult and requires that we repeatedly scan the list looking for those equations whose left hand sides appeared as right hand sides of the equations found during the previous scan. If the equations are already in a depth-first order (i.e. an order consistent with the ordering in the DAG), as are the equations (E.2) above, then this scan only has to be done once, or, equivalently, we can update all the values $s_t^k$ of the state variables by running through the equations (E.4) in the order k=1, ..., M. It is therefore important to be able to find a depth-first order for any process in $\Psi$. This can be done in two steps:

23

1. First we perform a single scan througth the list of equations and dynamically build the corresponding DAG as we go by allocating a new node for each variable when we first encounter it and connecting the nodes appearing on the right hand side of each equation to all the nodes appearing on the left hand side.
2. We then do a depth first search of this DAG and write out the defining equation for each variable as we return from visiting its node.

The resulting equations will then be written out in a depth-first order suitable for sequential updating of their left hand sides. Algorithms for performing 1 and 2 may be based on standard algorithms for building and searching directed graphs, and the GKFM algorithm uses these algorithms to put the equations for an arbitrary member of $\Psi$ in depth-first order.

We now return to the updating of the values of the state variables $s_t^k$ via the equations (E.4) and assume that these equations are in a depth-first order since we have seen how to put them in one if they are not. The coefficients $\beta_{k,i}$ in (E.4) with $i \geq k$ will then be zero and this equation can be rewritten $$s_t^k = \alpha k.0 s_{t-D_k}^k + \sum_{i=1}^{D_k-1} \alpha_{k,i} s_{t-i}^k + \sum_{i=1}^{k-1} \beta_{k,i} s_t^i + \gamma_k n_t^k \quad (E.5.a)$$

Running through the equations (E.5.a) in the order $k=1, \ldots, M$ updates all the variables $s^1, \ldots, s^M$. The observed variables can then be updated according to $$o_t^l = \sum_{i=1}^{M} c_{l,i} s_t^i + \sigma_l n_t^{M+l}; l = 1, \ldots, L \quad (E.5.b)$$

where the variables $s^i$, $i=1, \ldots, M$ and $n^{M+1}$ are the nodes to which $o^l$ is connected by directed edges with gain coefficients $c_{l,i}$, $i=1, \ldots, M$ and $\sigma_l$, $l=1, \ldots, L$, respectively.

The equations (E.3.b) are first order in the time subscript t, meaning that (E.3.b) defines $x_t$ in terms of $x_t$, whereas the equations (E.5.a) are of order $$\max_{1 \leq k \leq M} \{D_k\}.$$

In order to convert (E.5.a) to state space form, we must convert it to a first order system of equations by adding additional states to the original states $s_t^1, \ldots, s_t^M$ as follows—define $$S_k = \sum_{j=1}^{k} D_j$$

to be the partial sums of the $D_k$, and define $$x_t^{S_{k-1}+i} = s_{t-i}^k; i=0, \ldots, D_k-1, k=1, \ldots, M.$$

This defines $x_t^i$ for all i from 1 to $$S_M = \sum_{i=1}^{M} D_i.$$

The equations (E.5.a) may be rewritten in terms of the $x_t^i$ as $$x_t^i = x_{t-1}^{i+1}; i \neq s_j; j=1, \ldots, M \quad (E.6.a)$$

—continued $$x_t^{S_k} = \sum_{i=0}^{D_k-1} \alpha_{k,i} x_{t-1}^{S_k-i} + \sum_{i=1}^{k-1} \beta_{k,i} x_t^{S_i} + \gamma_k n_t^k; i = S_j.$$

The equations for the observation variables can then be written in terms of the $x_t^i$ as $$o_t^l = \sum_{i=1}^{M} c_{l,i} x_t^{S_i} + \sigma_l n_t^{M+l} \quad (E.6.b)$$

The equations (E.6.a) are first order in t and their right hand sides can be evaluated in the order $k=1, \ldots, S_M$ to yield the updated value of the state vector $x_t = (x_t^1, \ldots, x_t^{S_M})$. They are not quite of the form (E.3.b) since they are recursive in the components of the state vector $x_t$, i.e. equations for some of the updated components $x_t^i$ involve updated components $x_t^j$ with $j<i$. However, the $x_t^j$ can be easily eliminated from the right hand sides of these equations to yield a system of the form (E.3). When this is done, the matrices $A_t$, $F_t$, and $C_t$ for this system will not depend on the time index t.

The equations (E.6.a) states that the updating operations $x_{t-1} \rightarrow x_t$ amounts to a simple permutation of the components $x_{t-1}^i$ of the vector $x_{t-1}$ for any $i \neq S_j$, $j=1, \ldots, M$, or, equivalently, to a permutation of the indices of these components. The effect of this permutation on each of the disjoint intervals $[S_{k-1}+1, S_k]$ is to circularly shift the indices within this interval one unit to the left. Call this permutation l ( for left-shift). An explicit formula for l is $$l(i) = \begin{cases} i-1 & \text{for } i \neq S_{k-1}+1, k=1, \ldots, M \\ S_k & \text{for } i = S_{k-1}+1 \end{cases}$$

For any integer m, $l^m$ (the mth iteration of l) is the left circular shift by m units on each of the intervals $[S_{k-1}+1, S_k]$. This remains true for negative integers if we interpret a left circular shift by negative m to be a right circular shift by $|m|$ units. Accordingly, we will denote $l^{-1}$ by r ( for right-shift).

The shifting of the components of the state vector x in (E.6.a) is an expensive operation which can be eliminated by choosing a different state space model in which the matrices $A_t$, $F_t$, and $C_t$ are allowed to depend on the time index t. To this end define the components of a new state vector $\xi = (\xi^1, \ldots, \xi^{S_M})$ by $$\xi_t^i = x_t^{l^t(i)}$$

Then equations (E.6.a), written now in terms of $\xi_t$, become $$\xi_t^i = x_t^{l^t(i)} = x_{t-1}^{l^t(i)+1} = \xi_{t-1}^{l^{-1}(i)} \quad (E.7)$$

for all $i \neq r^t(S_k)$, $k=1, \ldots, M$. This just states that the components $\xi^i$, $i \neq r^t(S_k)$ of the new state vector $\xi$ remain unchanged from epoch t–1 to epoch t. In a computer implementation in which the same physical array is used to hold the logical arrays $\xi_{t-1}$ and $\xi_t$, this means that we can eliminate the equations (E.7) altogether. The remaining equations (E.6.a) written now in terms of $\xi_t$, become $$\xi_t^{r'(S_k)} = x_t^{S_k} \quad (E.8)$$

$$= \sum_{i=0}^{D_k-1} \alpha_{k,i} x_{t-i}^{S_k} + \sum_{i=1}^{k-1} \beta_{k,i} x_t^{S_i} + \gamma_k n_t^k$$

$$= \sum_{i=0}^{D_k-1} \alpha_{k,i} \xi_{t-i}^{r'(S_k)} + \sum_{i=1}^{k-1} \beta_{k,i} \xi_t^{r'(S_i)} +$$

$$\gamma_k n_t^k; k = 1, \ldots, M$$

The equations (E.8) for $k=1, \ldots, M$ comprise the complete set of equations for updating the state vector from $\xi_{t-1}$ to $\xi_t$. We can rewrite the set of equations (E.8) as a matrix equation of the form (E.3.b). For each fixed n and for $k=1, \ldots, M$ define an $S_M \times S_M$ matrix $_kA=[_kA_{ij}]$ and an $S_M \times M$ matrix $_kF=[_kF_{ij}]$ by $$_kA_{ij} = \begin{cases} 0 & i \neq r'(S_k), j \neq i \\ 1 & i \neq r'(S_k), j = i \\ \alpha_{k,l} & i = r'(S_k), j = r'(S_k - l) \\ \beta_{k,l} & i = r'(S_k), j = r'(S_l), l < k \end{cases} \quad (E.9)$$

$$_kF_{ij} = \begin{cases} 0 & i \neq r'(S_k) \\ \gamma_k & i = r'(S_k), j = k \end{cases} \quad (E.10)$$

and for $k=0, \ldots, M$ define the vector $_k\xi \equiv (_k\xi^1, \ldots, _k\xi^{S_M})$ by $$_k\xi^i = \begin{cases} \xi_t^i & i \leq S_k \\ \xi_{t-1}^i & i > S_k \end{cases}$$

Then it is clear that equation (E.8) can be written for $k=1, \ldots, M$ as $$_k\xi = _kA \cdot _{k-1}\xi + _kF \cdot N_t$$

where $N_t = (n_t^1, \ldots, n_t^M)$ is the vector with components equal to the noise variables appearing in (E.8). $N_t$ is called the process or state noise. Since $_0\xi = \xi_{t-1}$ and $_M\xi = \xi_t$, it follows that $$\xi_t = {}_MA \cdot {}_{M-1}A \ldots {}_1A \cdot \xi_{t-1} + \left[ \sum_{i=1}^{M-1} {}_MA \cdot {}_{M-1}A \ldots {}_{i+1}A \cdot {}_iF + {}_MF \right] N_t$$

This gives an equation of the form (E.3.b) for our state variables in which the system matrices are given by $$A_t = \prod_{i=0}^{M-1} {}_{M-i}A \quad (E.11)$$

and $$F_t = \sum_{i=1}^{M-1} \left( \prod_{j=1}^{i} {}_{M-j}A \right) \cdot {}_{M-i}F + {}_MF \quad (E.12)$$

The equations for the observed variables $o^i$ may be written in terms of $\xi$ and the $n^i$ as $$o_t^i = \sum_{i=1}^{M} c_{i,j} s_t^j + \sigma_i n_t^{M+i} \quad (E.13)$$

$$= \sum_{i=1}^{M} c_{i,j} x_t^{S_i} + \sigma_i n_t^{M+i}$$

$$= \sum_{i=1}^{M} c_{i,j} \xi_t^{r'(S_i)} + \sigma_i n_t^{M+i}$$

If we define the L×M matrix $C_t=[C_{ij}]$ by $$C_{ij} = \begin{cases} 0 & j \neq r'(S_i) \text{ for any } i = 1, \ldots, M \\ c_{i,j} & j = r'(S_i) \end{cases} \quad (E.14)$$

and the vector $o_t$ by $$o_t = (o_t^1, \ldots, o_t^L) \quad (E.15)$$

and let $\sigma$ be the diagonal matrix $$\sigma = \text{diag } \{\sigma_i\}_{i=1}^{L}$$

then the equations for the observation vector or may be written in matrix form as $$o_t = C_t \xi_t + \sigma N_t^o$$

where $N_t^o = (n_t^{M+1}, \ldots, n_t^{M+L})$ is the vector with components equal to the noise variables appearing in (E.13). This equation is of the form (E.3.a). Summarizing, we see that the a state space representation for our process (assumed to belong to $\Psi$ is $$o_t = C_t x_t + \sigma N_t^o \quad (E.16.a)$$

$$x_{t+1} = A_t x_t + F_t N_t \quad (E.16.b)$$

where the system matrices $A_t$, $F_t$, $C_t$, and $\sigma$ are given by (E.11), (E.12), (E.14), (E.15) and where we have reverted to our old notation using x instead of $\xi$ for the state vector since the system (E.16) is the only one we will discuss from now on and there should be no confusion between the x in (E.16.b) and the x in equation (E.6.a).

E.3 The Kalman Filter Update Equations

In Appendix A we have presented the Kalman filter update equations for the single observation case (L=1). Here we present the Kalman filter update equations for the multiple observation case (L>1) and split them into two parts—a time update part and a measurement update part. This corresponds to the way they are implemented in the GKFM algorithm.

The convential Kalman filter equations for the multiple observation case for updating the optimal state estimate $\hat{x}_t$ and its error covariance matrix $E[(\hat{x}_t - x_t)(\hat{x}_t - x_t)^T]$ are given by Time Update Equations $$\bar{x}_{t+1} = A_t \hat{x}_t \quad (E.17.a)$$

$$H_{t+1} = A_t P_t A_t^T + F_t F_t^T \quad (E.17.b)$$

Measurement Update Equations $$K_t = H_t C_t^T [C_t H_t C_t^T + \sigma^2]^{-1}$$

$$\hat{x}_t = \bar{x}_t + K_t [o_t - C_t \bar{x}_t]$$

$$P_t = [I - K_t C_t] H_t \quad (E.18)$$

$\bar{x}_{t+1}$ is the linear least squares estimate of $x_{t+1}$ given $o_t$, $o_{t-1}, \ldots$ and $H_{t+1} = E[(\bar{x}_t - x_t)(\bar{x}_t - x_t)^T]$ is its error covariance matrix. $K_t$ is the Kalman gain matrix—it multiplies tf observed one-step-ahead forecast error $o_t - C_t \bar{x}_t$ to give the correction term which must be added to the one-step-ahead forecast to arrive at the current estimate $\hat{x}_t$.

In the GKFM algorithm we update a square root (i.e., a matrix L such that $P_t = LL^T$) of $P_t$ rather than $P_t$ itself and we express the gain matrix $K_t$ in terms of this square root. (A symmetric matrix P is non-negative definite if and only if it has a square root.) Algorithms like ours which update a square root of $P_t$ are called square root algorithms and are discussed in detail in Bierman, G. J., *Factorization Methods for Discrete sequential Estimation*, Academic Press, Inc. New York, 1977. Among the many choices available for this square root, one that minimizes storage requirements is the square lower triangular (or Cholesky) factor L of $P_t$ since the elements of L lying above the main diagonal are zero and do not have to be stored. (A matrix L with elements $L_{ij}$ is lower triangular if $L_{ij} = 0$ for all $i<j$. Note that this definition includes non-square as well as square matrices.) Since there are $\frac{1}{2}S_M(S_M-1)$ of these super-diagonal elements for processes in $\Psi$ and since $$S_M = \sum_{i=1}^{M} D_i$$

can be large for seasonal ARI processes, this is an important consideration. For this reason the GKFM algorithm updates the Cholesky square root of $P_t$ and $H_t$. We will now show how.

E.4 The GKFM Time Update Algorithm

E.4.1 Description

The GKFM algorithm forms the lower triangular Cholesky factor $\tilde{L}$ of $H_{t+1}$ $$H_{t+1} = \tilde{L}\tilde{L}^T \tag{E.19}$$

directly from the lower triangular Cholesky factor L of $P_t$ without having to form $H_{t+1}$ first. Note from $H_{t+1} = A_t P_t A_t^T + F_t F_t^T$ and $P_t = LL^T$ that we can write $$H_{t+1} = |A_t L F_t| \begin{bmatrix} L^T A_t^T \\ F_t^T \end{bmatrix}. \tag{E.20}$$

This is of the form (E.19) except that the matrix $|A_t L\ F_t|$ is neither lower triangular nor square (it has dimension $S_{M \times (S_M+L)}$). We need to convert (E.20) into the form (E.19) with $\tilde{L}$ square lower triangular. Suppose we can find an $(S_M+L) \times (S_M+L)$ orthogonal matrix $O(OO^T=I)$ such that $$|A_t L\ F_t|O = [\tilde{L}\ 0] \tag{E.21}$$

with $\tilde{L}$ square lower triangular and O equal to the $S_M \times L$ zero matrix. Then we'll have $$\begin{aligned} H_{t+1} &= |A_t L F_t| \begin{bmatrix} L^T A_t^T \\ F_t^T \end{bmatrix} \\ &= |A_t L F_t|OO^T \begin{bmatrix} L^T A_t^T \\ F_t^T \end{bmatrix} \\ &= |\tilde{L}O| \begin{bmatrix} \tilde{L}^T \\ O^T \end{bmatrix} = \tilde{L}\tilde{L}_T \end{aligned} \tag{E.22}$$

and $\tilde{L}$ will be a Cholesky factor of $H_{t+1}$. So we have reduced the problem of finding the Cholesky factor of $H_{t+1}$ to the problem of finding an orthogonal matrix O such that (E.21) holds. Before we outline an algorithm for doing this we need to state two definitions:

Givens Rotation—The Givens rotation $G(j,k,\theta)$, $j<k$ is defined to be the matrix that acts as a planar rotation by $\theta$ radians on the subspace spanned by the j-th and k-th coordinate vectors and acts as the identity on the subspace spanned by the remaining coordinate vectors. Clearly, $G(j,k,\theta)$ is a square orthogonal matrix with determinant=1.

Hessenberg Matrices—A (lower) Hessenberg matrix $M=|M_{ij}|$ is a matrix whose only non-zero elements lying above the main, diagonal $i=j$ are those with $j=i+1$, i.e. $M_{ij}=0$ for all $j>i+1$.

Our algorithm for finding the Cholesky factor $\tilde{L}$ of $H_{t+1}$ given the Cholesky factor L of $P_t$ is then Set $_0L=L$.
For $k=1, \ldots, M$ 1. Form $_kA \cdot_{k-1}L$ where $_kA$ is the matrix with components given by (E.9).
2. Convert $_kA \cdot_{k-1}L$ to lower Hessenberg form $_kL_H$ by post-multiplying by $S_k-r'S_k$) Givens matrices.
3. Convert $_kL_H$ to lower triangular form $_kL_T$ by post-multiplying by $S_k-r'(S_k)-1$ Givens matrices.
4. Convert $[_kL_T\ _kF]$ to lower triangular form $[_kL\ O]$ by post-multiplying by $S_M-r'(S_k)+1$ Givens matrices. $_kF$ here is the matrix with components given by (E.10).

Set $\tilde{L}=_ML$. The matrix $\tilde{L}$ will then be a lower triangular (Cholesky) factor of $H_{t+1}$.

This algorithm works due to the following facts:

I. A product of orthogonal matrices is orthogonal. In particular, the product of the Givens matrices in steps 2 and 3 is orthogonal and so is the product of the Givens matrices in step 4.

II. If $O_1$ is the product of the Givens matrices in steps 2 and 3 so that $$_kA \cdot_{k-1}L \cdot O_1 =_kL_T$$

with $_kL^T$ square lower triangular, and if $O_2$ is the product of the Givens matrices in step 4 so that $$[_kL_T\ _kF] \cdot O_2 = [_kL\ O]$$

with $_kL$ square lower triangular, then $$[_kA \cdot_{k-1}L_kF] \cdot \begin{bmatrix} O_1 \\ I \end{bmatrix} \cdot O_2 = [_kLO] \tag{E.23}$$

is of the form (E.21), since $$\begin{bmatrix} O_1 \\ I \end{bmatrix}$$

$\cdot O_2$ is orthogonal.

III. Define the matrices $_kP$ inductively for $k=0, \ldots, M$ by $$_0P = P_t$$
$$_kP =_kA \cdot_{k-1}P \cdot (_kA)^T +_kF \cdot (_kF)^T. \tag{E.24}$$

Then a. $_kL$ appearing in step 4 is the Cholesky factor of $_kP$, i.e. $_kP =_kL \cdot_kL^T$.
b. $_MP = H_{t+1}$.

IIIa. follows from (E.24) and (E.23) in the same way that (E.22) follows from (E.17.b) and (E.20). III.b follows from (E.24) by induction on k using the fact that $_kF(_jF)^T=0$ for $j<k$ (which follows from condition 5 of section 3). A complete pseudo-code listing of this time update algorithm is given in the next sub-section.

E.4.2 A Pseudo-Code Listing for the Time Update Portion of the GKFM

FIG. 5 is a pseudo-code listing for the time update portion of the GKFM.

Note in FIG. 5 that steps 2 and 3 are skipped for any value of k for which the only non-zero auto-regressive coefficient $\alpha_{k,l}$ is $\alpha_{k,0}$. For these values of k, the matrix ${}_kA\cdot{}_{k-1}L$ is already lower triangular (since the matrix ${}_kA$ is) and so steps 2 and 3 are unnecessary. This is true for all k=1, . . . , 6 for the process presented in FIG. 4 Also, step 4 is skipped for any value of k for which $\gamma_k$=0. For these values of k the matrix $F_l^k$ is zero. This is true for k=3 and 4 in FIG. 4

E.4.3 The GKFM Measurement Update Algorithm

In the previous section we presented a square root type algorithm for implementing the Kalman filter time update equations (E.17.a) and (E.17.b). This algorithm must be combined with a square root algorithm for the measurement update equations (E.18) in order to yield a complete algorithm for updating the state estimate $\hat{x}_t$. This measurement update algorithm must find the Cholesky factor of $P_t$ appearing on the left hand side of (E.18) given the Cholesky factor of $H_t$ appearing on the right hand side and must compute $K_t$ in terms of this $H_t$. There is a standard algorithm for doing this in the case L=1 (single observation case) called Carlson's algorithm. It is described on p. 81 of Bierman, G. J., "Factorization Methods for Discrete Sequential Estimation", (Academic Press, Inc., New York, 1977) (incorporated herein by reference) and a FORTRAN listing is given on p. 102 of this same book.

There is also a standard algorithm for reducing the L>1 case to the L=1 case called the sequential algorithm. This algorithm is presented in sec. 7.1, pp. 97–102 of Chui, C. K. and Chen, G., "Kalman Filtering with Real-Time Applications" (Springer-Verlag, New York, 1991) (incorporated herein by reference). The measurement update portion of the GKFM algorithm is obtained by combining these two algorithms. This combined algorithm is presented in sec. 7.3, pp. 105–106, of Chui et al., except that the GKFM algorithm substitutes Carlson's algorithm for the step (ii) (b) given in Chui et al.

Recall that in the time update step we reduced the covariance update equation (E.17.b) to M equations (E.24) each of which we were able to update efficiently. Similarly, the sequential algorithm reduces the multiple observation (L>1) measurement update equations (E.18) to L single observation measurement update equations. More exactly, let $C_t=[c^1 \cdots c^L]^T$ and define a sequence of vectors ${}_l k$, ${}_l \hat{x}$ and matrices ${}_l H$ for l=1, . . . , L according to the scheme $$\left.\begin{array}{rcl} {}_0H & = & H_t \\ {}_0\hat{x} & = & \bar{x}_t \\ {}_lk & = & \dfrac{1}{(c^l)^T \cdot {}_{l-1}H \cdot c^l + \sigma_l^2} \cdot {}_{l-1}H \cdot c^l \\ {}_l\hat{x} & = & {}_{l-1}\hat{x} + {}_lk \cdot [o_t^l - (c^l)^T \cdot {}_{l-1}\hat{x}] \\ {}_lH & = & [I - {}_lk \cdot (c^l)^T] \cdot {}_{l-1}H \end{array}\right\} \quad \text{(E.25.1)}$$

Then the sequential algorithm relies on the fact that $$_L\hat{x}=\hat{x}_t \quad \text{(E.26)}$$

$$_LH=H_t \quad \text{(E.27)}$$

This is proved as Theorem 7.1 in Chui. The quantities $\sigma_l$, l=1, . . . , L are the diagonal elements of the matrix $\sigma$. Note that the equations (E.25.1) are identical in form to the single observation (L=1) case of (E.18) and hence Carlson's algorithm can be applied to compute the quantities ${}_lk$ and ${}_l\hat{x}$ on the left hand side of (E.25.1), as well as the Cholesky factor of ${}_lH$. When we have done this for all l=1, . . . , L, the result, by (E.26) and (E.27), will be that we will have a Cholesky factor of $H_t$ as well as the updated value of the state estimate $\hat{x}_t$.

The importance of the sequential algorithm for us, besides the fact that it allows us to efficiently compute $H_t$ and $\hat{x}_t$ is that it allows us to apply outlier rejection and missing data treatment to each channel separately. We will see this in the next subsection where we give the remainder of the pseudocode listing of the GKFM. algorithm.

E.4.4 The Complete GKFM Algorithm

We now put the pieces we have developed above into a complete general purpose monitoring algorithm. The steps of this algorithm will be as follows:

At epoch t:

1. Set: $\gamma_{temp}$=0 $L_\gamma$=0)

2. Use the Time Update Portion of the GKFM algorithm to transform a Cholesky factor L of $P_t$ to a Cholesky factor $\tilde{L}$ of $H_{t+1}$.

For l=1, . . . , L 3.1 Missing Data Treatment—If $o_t^l$ is missing increment loop index l→l+1 and continue this loop (starting with step 3.l+1)

4.1 Perform Outlier Rejection on channel l—see below 5.1 Use Carlson's algorithm to compute the updated value of the state estimate ${}_l\hat{x}$ and the Cholesky factor of ${}_lH$ in (E.25.1)

6. Update $\gamma_t$ to $\gamma_{t+1}$

7. Form alarm variables.

We have discussed above steps 2 and 5.1. Step 3.1 is self explanatory. We now detail steps (4.1, 6, and 7).

Step 4.1 is similar to the single observation case presented in Appendix B. Equations (B'.1–4) below correspond to equations (B'.1–4) in Appendix B:

$$\text{Step 4.1} \begin{cases} v & = o_{t+1}^l - (c^l)^T \cdot \bar{x}_{t+1} \\ \sigma_l & = 1 \quad \text{(B'.1)} \\ \sigma_v^2 & = (c^l)^T \cdot {}_l\tilde{L} \cdot {}_l\tilde{L}^T \cdot c^l + \sigma_l^2 \\ \Delta\sigma_l^2 & = \max\left\{\dfrac{v^2}{T_{thres} \cdot \gamma_t} - \sigma_v^2, 0\right\} \quad \text{(B'.2)} \\ \text{If } \Delta\sigma_l^2 & = 0 \\ & \gamma_{temp} = \gamma_{temp} + \left(\dfrac{v}{v_\sigma}\right)^2 \\ & L_\gamma = L_\gamma + 1 \\ & \quad \text{(B'.3)} \\ \sigma_l^2 & = \sigma_l^2 + \Delta\sigma_l^2 \\ \sigma_v^2 & = \sigma_v^2 + \Delta\sigma_l^2 \quad \text{(B'.4)} \end{cases}$$

Likewise, step 6 is similar to the single observation case presented in Appendix C. Equations (C'.1–4) below correspond to equations (C.1–4) in Appendix C.

Step 6 
$$\begin{cases} p_{t+1} = p_t + \dfrac{\alpha_\gamma^2}{1-\alpha_\gamma} & (C.1) \\ \sigma_p^2 = L^2 \\ \Delta\sigma_p^2 = \max\left\{ \dfrac{\left[\dfrac{\gamma_{temp}}{\gamma_t} - L_\gamma\right]^2}{S_{thres}} - \right\} \\ \qquad\qquad\qquad (L_\gamma^2 \cdot p_{t+1} + \sigma_p^2), 0 \\ \sigma_p^2 = \sigma_p^2 + \Delta\sigma_p^2 \\ k = \dfrac{L_\gamma \cdot p_{t+1}}{L_\gamma^2 \cdot p_{t+1} + \sigma_p^2} & (C.2) \\ \gamma_{t+1} = \gamma_t + k \cdot (\gamma_{temp} - L_\gamma \cdot \gamma_t) & (C.3) \\ p_{t+1} = \dfrac{\sigma_p^2}{L_\gamma^2 \cdot p_{t+1} + \sigma_p^2} \cdot p_{t+1} & (C.4) \end{cases}$$

We now explain step 7. In Appendix D, we saw that the alarm variable $\beta_{t+1}$ for the ratios monitoring algorithm is a normalized version of a component $\hat{x}_{t+1}^{25}$ of the state estimate vector $\hat{x}_{t+1}$. Similarly, in the GKFM algorithm we may define one or more alarm variables as normalized versions of linear combinations of the components of the state estimate vector $\hat{x}_{t+1}$. The general definition of such an alarm variable $\beta_t$ is as follows:

$$\beta_t = \dfrac{\sum_{i=1}^{M} a_i \cdot x_t^{(i)}}{\sqrt{\gamma_t \cdot \sum_{i=1}^{M}\sum_{j=1}^{M} a_i \cdot P_{r(i),r(j)} \cdot a_j}}$$

where $\alpha_i$ can be arbitrary real numbers. An alarm (of type corresponding to $\beta_t$) is issued when $$|\beta_t| > \text{THRESHOLD}$$

just as in Appendix D, where THRESHOLD is a fixed constant representing the threshold for alarming. Of course, different values of THRESHOLD could be chosen to represent different levels of severity of alarm.

I claim:

1. A method for detecting recording errors in a telephone network that provides services to a plurality of customers, said method comprising:
   recording information output by said telephone network relating to the provision of a service to said customers, said information having a periodic pattern;
   identifying disturbances in said periodic pattern that persist for longer than a predetermined period based on current knowledge of said information and on knowledge of a history of said information derived over a plurality of periods; and
   generating an alarm when said identified disturbances exceed a threshold.

2. A method for detecting recording errors in a telephone network that provides services to a plurality of customers, said method comprising:
   recording information output by said telephone network in a first time period relating to the provision of a service to said customers, said information having a periodic pattern;
   using a model to generate a forecast of information that will be output by said network in a second time period that has not yet occurred utilizing said information recorded during said first time period, said model including a plurality of states representing disturbances in said periodic pattern, each said state representing a disturbance having a different persistence;
   obtaining information output by said telephone network relating to the provision of said service to said customers during said second time period;
   comparing said forecast with the information obtained during said second time period to generate a deviation;
   using said deviation to update each of said states; and
   generating an alarm when a selected one of said states exceeds a threshold.

3. The method of claim 2 wherein said selected one of said states is a state having a longer persistence than any of said other states.

4. The method of claim 2 wherein said recorded information is a ratio of calls connected in said network to calls disconnected in said network over a predetermined time period.

5. The method of claim 2 wherein said recorded information is the volume of calls made in said network over a predetermined time period.

6. The method of claim 2 wherein said step of using a model to generate a forecast comprises utilizing information recorded prior to said first time period in addition to utilizing information recorded in said first time period.

7. The method of claim 2 further comprising the steps of:
   forecasting, utilizing said information recorded during said second time period and information recorded prior to said second time period, the expected content of information that will be output by said network for a third time period that has not yet occurred;
   recording information output by said telephone network relating to the provision of said service to said customers in said third time period; and
   comparing the result of said step of forecasting associated with said third time period with the information recorded during said third time period to generate a second deviation.

8. The method of claim 7 further comprising the steps of:
   using said second deviation to update each of said states; and
   generating an alarm when a selected one of said states exceeds a threshold.

9. The method of claim 2 wherein said steps are carried out for a plurality of services provided by said network.

10. The method of claim 2 wherein each of said steps are iteratively repeated to continually generate deviations corresponding to a comparison of data recently output by said network and a forecast for said recently output data, and wherein said states are iteratively updated and alarms are generated if a selected updated state exceeds a threshold.

11. The method of claim 2 further comprising the step of updating said forecast, said forecast being updated using Kalman filtering.

12. A method for detecting recording errors in a telephone network that provides services to a plurality of customers, said method comprising:
   recording information output by said telephone network relating to the provision of a service to said customers, said information having a periodic pattern;
   modeling said information using a first state and a second state, said first state representing disturbances in said periodic pattern of a first duration, and said second state representing disturbances in said periodic pattern of a second duration, said second duration being longer than said first duration, and said disturbances based on current knowledge of said information and on knowledge of a history of said information derived over a plurality of periods; and generating an alarm when a disturbance in said second state exceeds a threshold.

13. The method of claim 12, further comprising the steps of:

using said first and second states to generate a forecast of information that will be output by said telephone network for a time period that has not yet occurred;

recording information output by said telephone network during said time period; and comparing the result of said forecasting step with the information recorded during said time period to generate a deviation.

14. The method of claim 13 further comprising the step of using said deviation to update each of said steps.

15. A method for detecting recording errors in a telephone network that provides services to a plurality of customers, said method comprising:

recording information output by said telephone network relating to the provision of a service to said customers, said information having a periodic pattern;

identifying disturbances in said periodic pattern of a first duration based on current knowledge of said information and on knowledge of a history of said information derived over a plurality of periods;

identifying disturbances in said periodic pattern of a second duration based on current knowledge of said information and on knowledge of a history of said information derived over a plurality of periods, said second duration being longer than said first duration;

generating an alarm when said disturbance of said second duration exceeds a threshold.

16. A method for detecting recording errors in a telephone network that provides services to a plurality of customers, said method comprising:

(a) recording information output by said telephone network relating to the provision of a service to said customers in a first time period;

(b) modeling said information recorded in said first time period using a first state and a second state, said first state representing disturbances in said information of a first persistence and said second state representing disturbances in said information of a second persistence, said second persistence being longer than said first persistence;

(c) using said first and second states to generate a forecast of information to be output by said network for a future time period;

(d) recording, during the occurrence of said future time period, information output by said telephone network relating to the provision of said service to said customers;

(e) comparing the forecast generated in step (c) with the information recorded in step (d) to generate a deviation;

(f) updating each of said states based on said deviation generated in the preceding step;

(g) generating an alarm when a selected one of said states exceeds a threshold; and (h) iteratively repeating steps (c)–(g) to continually generate alarms whenever said selected one of said states exceeds said threshold.

17. The method of claim 16 wherein said selected one of said states is said second state.

18. A system for detecting recording errors in a telephone network that provides services to a plurality of customers, said system comprising:

an information recorder for recording information output by said telephone network relating to the provision of a service to said customers, said information having a periodic pattern;

apparatus for identifying disturbances in said periodic pattern that persist for longer than a predetermined time period based on current knowledge of said information and on knowledge of a history of said information derived over a plurality of periods; and an alarm generator for generating an alarm when said identified disturbances exceed a threshold.

19. A system for detecting recording errors in a telephone network that provides services to a plurality of customers, said system comprising:

an information recorder for recording information output by said telephone network in a first time period relating to the provision of a service to said customers, said information having a periodic pattern;

a model for generating a forecast of information that will be output by said network in a second time period that has not yet occurred utilizing said information recorded during said first time period, said model including a plurality of states representing disturbances in said periodic pattern, each said state representing a disturbance having a different persistence;

apparatus for obtaining information output by said telephone network relating to the provision of said service to said customers during said second time period;

a comparator for comparing said forecast with the information obtained during said second time period to generate a deviation, said deviation used to update each of said states; and an alarm generator for generating an alarm when a selected one of said states exceeds a threshold.

20. The apparatus of claim 19 wherein said selected one of said states is a state having a longer persistence than any of said other states.

21. The apparatus of claim 19 wherein said recorded information is a ratio of calls connected in said network to calls disconnected in said network over a predetermined time period.

22. The apparatus of claim 19 wherein said recorded information is a volume of calls made in said network over a predetermined time period.

23. The apparatus of claim 19 wherein said forecast is generated utilizing information recorded prior to said first time period in addition to utilizing information recorded in said first time period.

* * * * *